US012717180B2

(12) United States Patent
Hu et al.

(10) Patent No.: US 12,717,180 B2
(45) Date of Patent: Aug. 25, 2026

(54) SEMICONDUCTOR PHOTONICS DEVICE AND METHODS OF FORMATION

(71) Applicant: Taiwan Semiconductor Manufacturing Company, Ltd., Hsinchu (TW)

(72) Inventors: Fan Hu, Taipei City (TW); YingKit Felix Tsui, Cupertino, CA (US); Hsiang-Fu Chen, Zhubei City (TW); Chia-Ming Hung, Zhubei City (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 317 days.

(21) Appl. No.: 18/404,168

(22) Filed: Jan. 4, 2024

(65) Prior Publication Data

US 2025/0208445 A1 Jun. 26, 2025

Related U.S. Application Data

(60) Provisional application No. 63/612,942, filed on Dec. 20, 2023.

(51) Int. Cl.
*G02F 1/01* (2006.01)
*G02F 1/025* (2006.01)

(52) U.S. Cl.
CPC ............ *G02F 1/025* (2013.01); *G02F 1/0147* (2013.01)

(58) Field of Classification Search
CPC ............................... G02F 1/025; G02F 1/0147
See application file for complete search history.

(56) References Cited

U.S. PATENT DOCUMENTS 7,705,455 B2 * 4/2010 Miyakawa .............. H01L 25/50 438/455
8,149,890 B2 * 4/2012 Park .................... H01S 5/06258 372/34
8,742,590 B2 * 6/2014 Beyne ................... H01L 23/481 257/E21.573

(Continued)

FOREIGN PATENT DOCUMENTS

TW 201407727 A 2/2014
TW 202137294 A 10/2021

(Continued)

*Primary Examiner* — Ryan A Lepisto
(74) *Attorney, Agent, or Firm* — Harrity & Harrity, LLP

(57) ABSTRACT

A semiconductor photonics device includes an optical modulator structure and a modulator heater structure in one or more dielectric layers of the semiconductor photonics device. An isolation trench is included around the modulator heater structure to reduce the likelihood of damage to the dielectric layer(s) that might otherwise be caused by thermal stress. The isolation trench may include an air gap through the dielectric layer(s), and the air gap surrounds the modulator heater structure in a top-down view of the semiconductor photonics device. The isolation trench reduces the amount of heat absorbed in the dielectric layer(s) in that the isolation trench thermally isolates the modulator heater structure from the dielectric layer(s). This reduces the likelihood of cracking, delamination, and/or another type of damage to the dielectric layer(s) that might otherwise be caused by thermal stress to the dielectric layer(s).

20 Claims, 25 Drawing Sheets

(56) References Cited

U.S. PATENT DOCUMENTS 9,214,374 B2 * 12/2015 Lee .................... H01L 21/6835
9,231,361 B2 * 1/2016 Chen ...................... H01S 3/042
9,448,422 B2 * 9/2016 Celo .................... G02B 6/3596
9,577,035 B2 * 2/2017 Hurwitz ............... H10D 62/113
10,090,451 B2 10/2018 Meade et al.
10,867,908 B2 * 12/2020 Ding ................ H01L 21/76877
11,226,506 B2 * 1/2022 Lin ......................... G02F 1/225
11,327,228 B2 * 5/2022 Hsu .................... G02B 6/12004
12,174,425 B2 12/2024 Malhouitre et al.
2002/0028045 A1 3/2002 Yoshimura et al.
2023/0366913 A1 11/2023 Kamineni et al.

FOREIGN PATENT DOCUMENTS

TW 202229949 A 8/2022
TW 202230468 A 8/2022

* cited by examiner

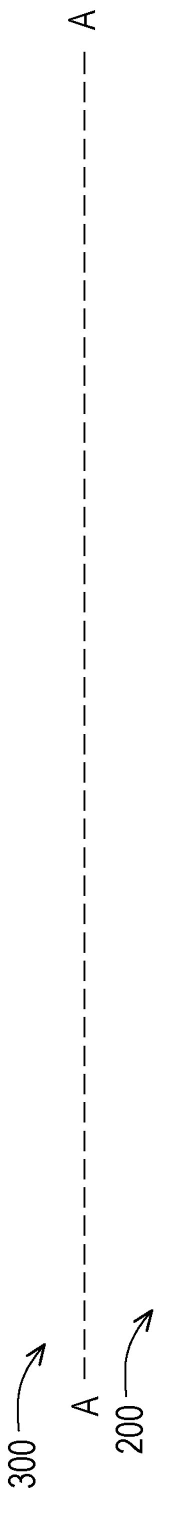
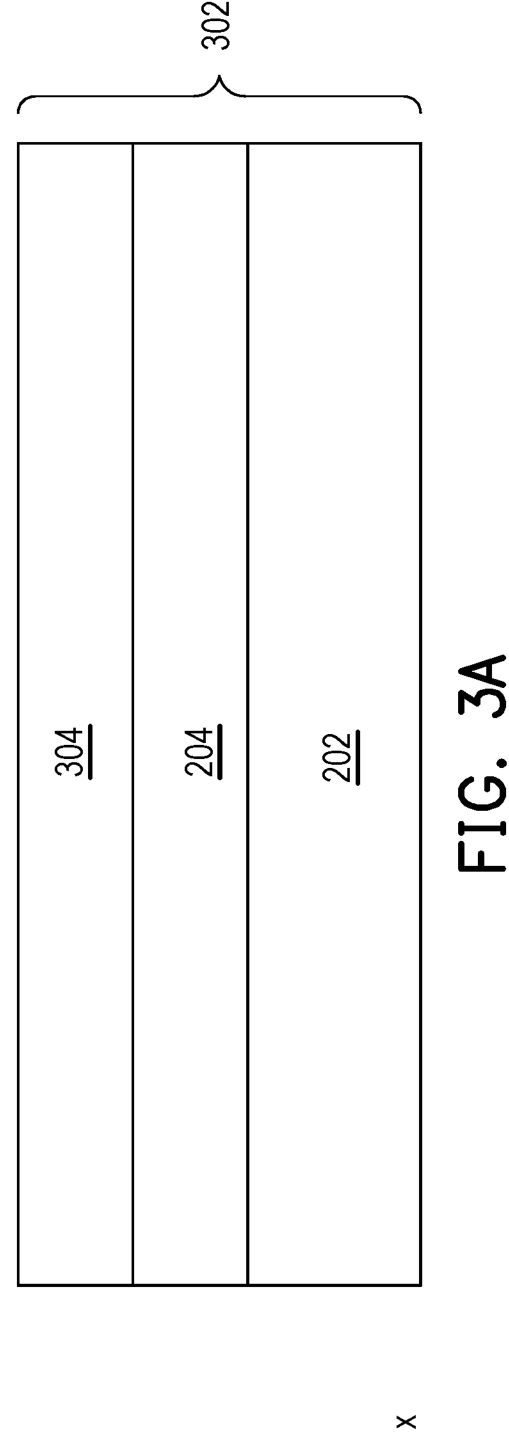
FIG. 3A

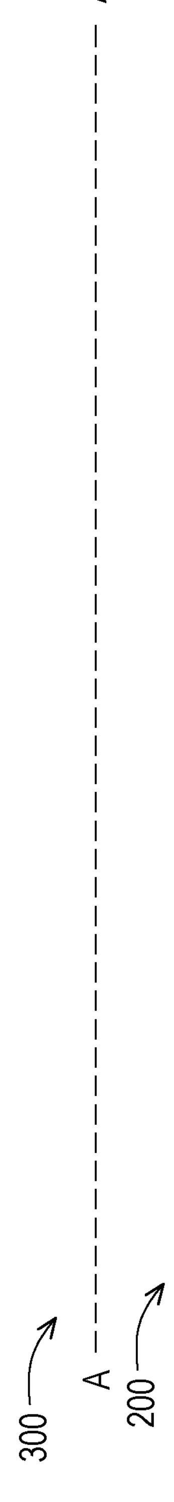
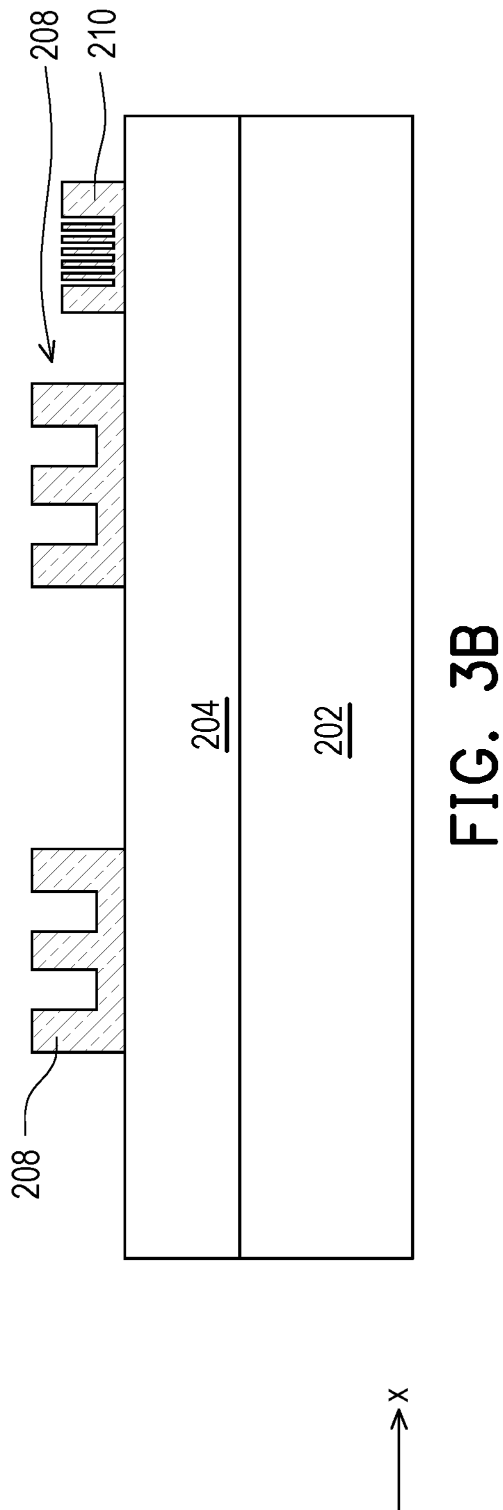
FIG. 3B

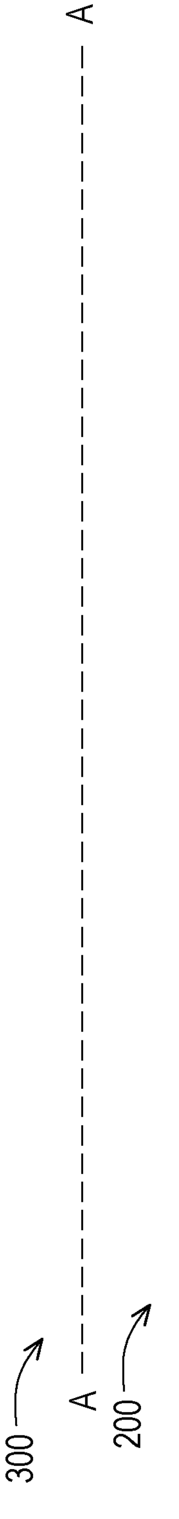
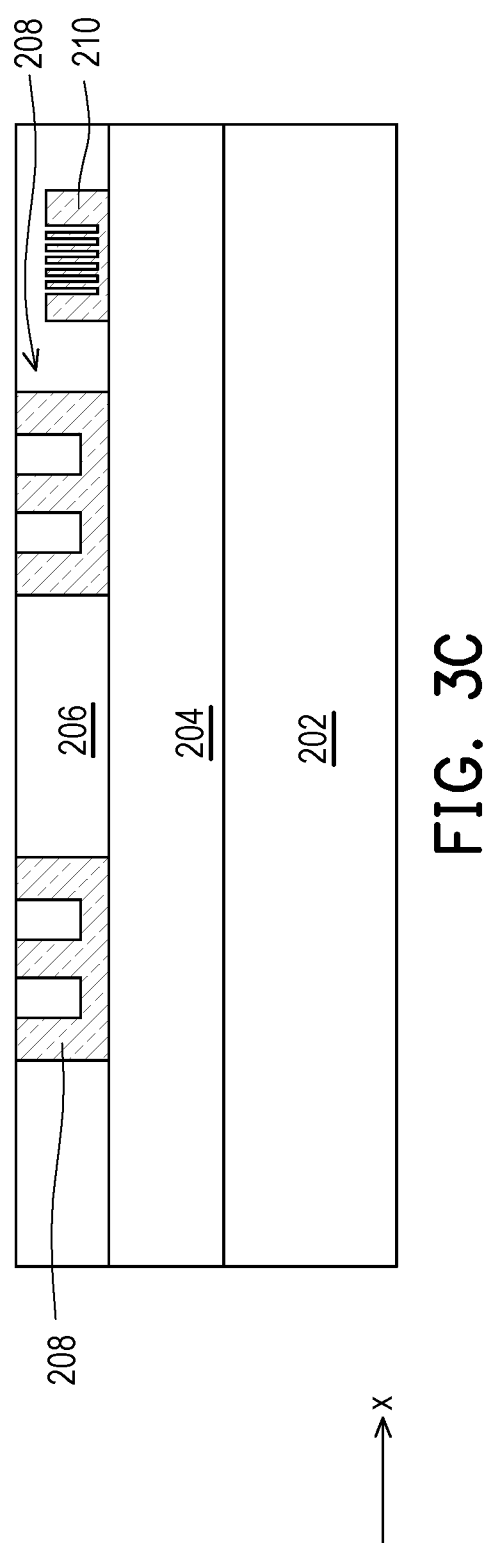
FIG. 3C

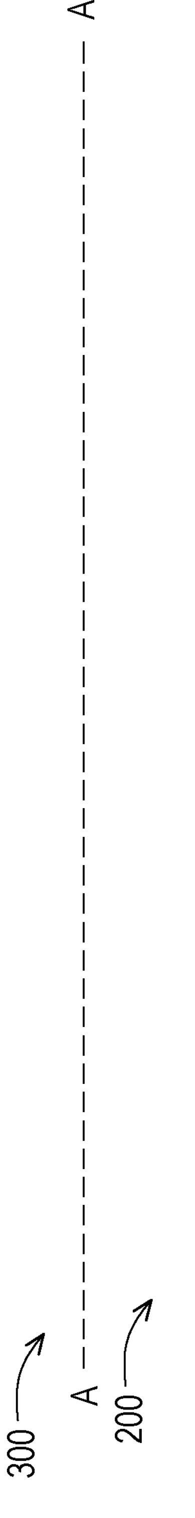
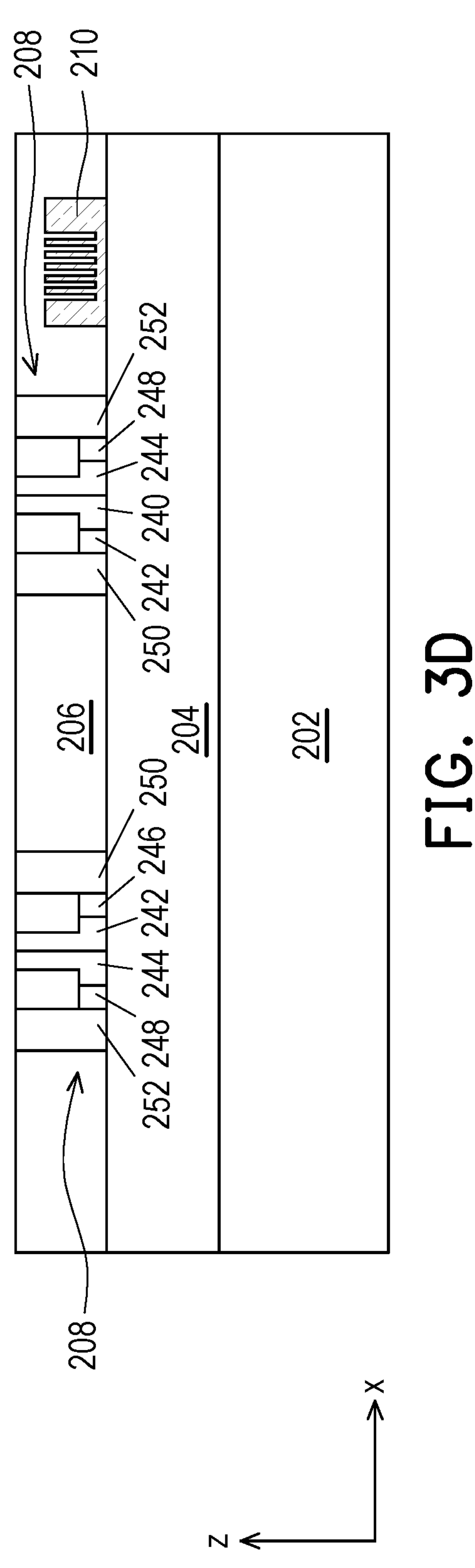
FIG. 3D

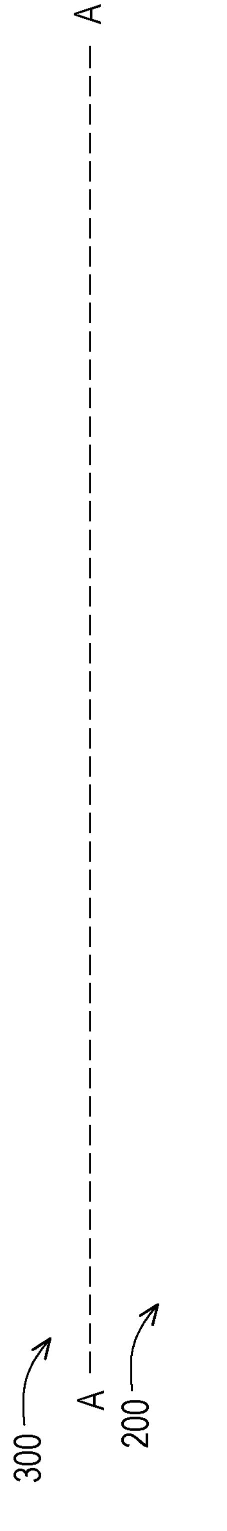
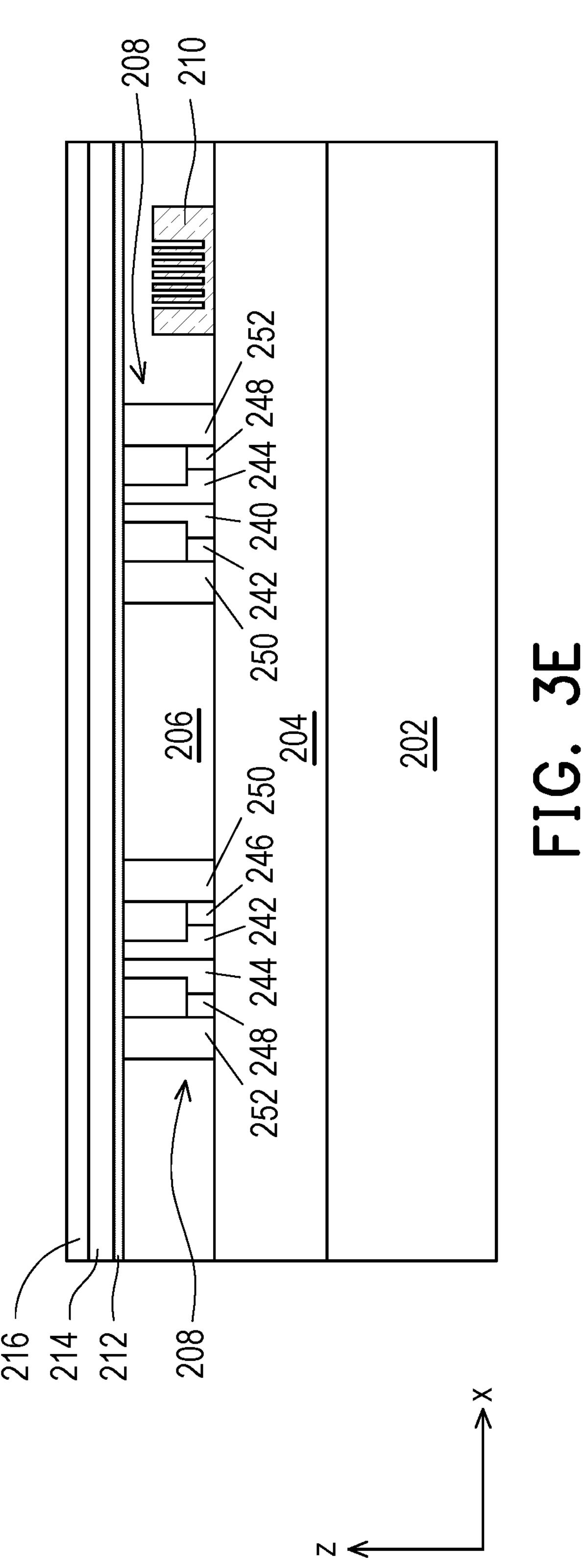
FIG. 3E

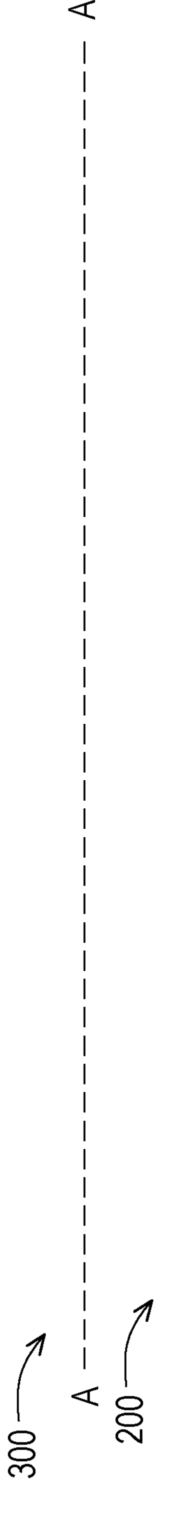
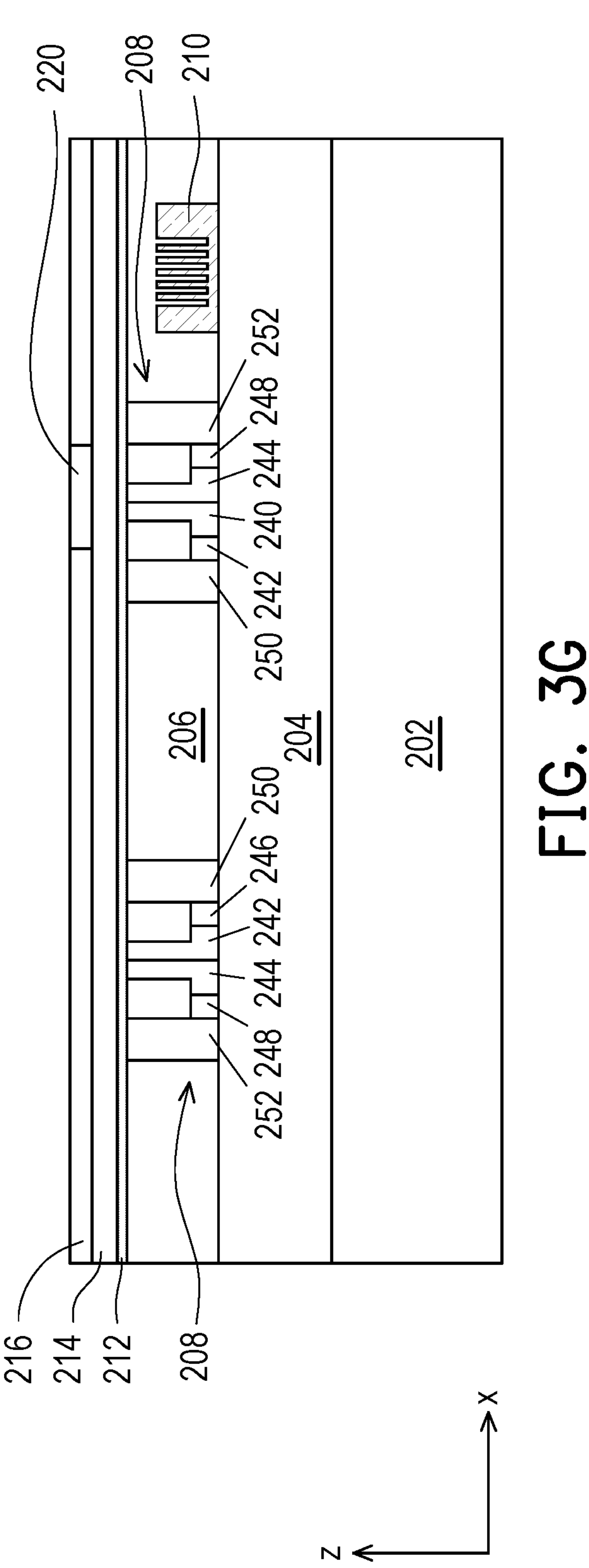
FIG. 3G

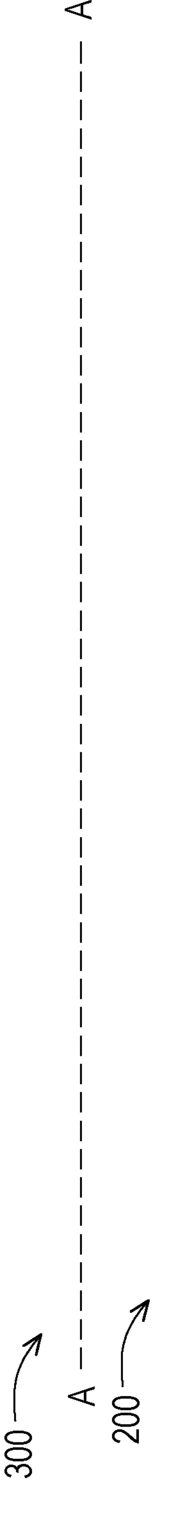
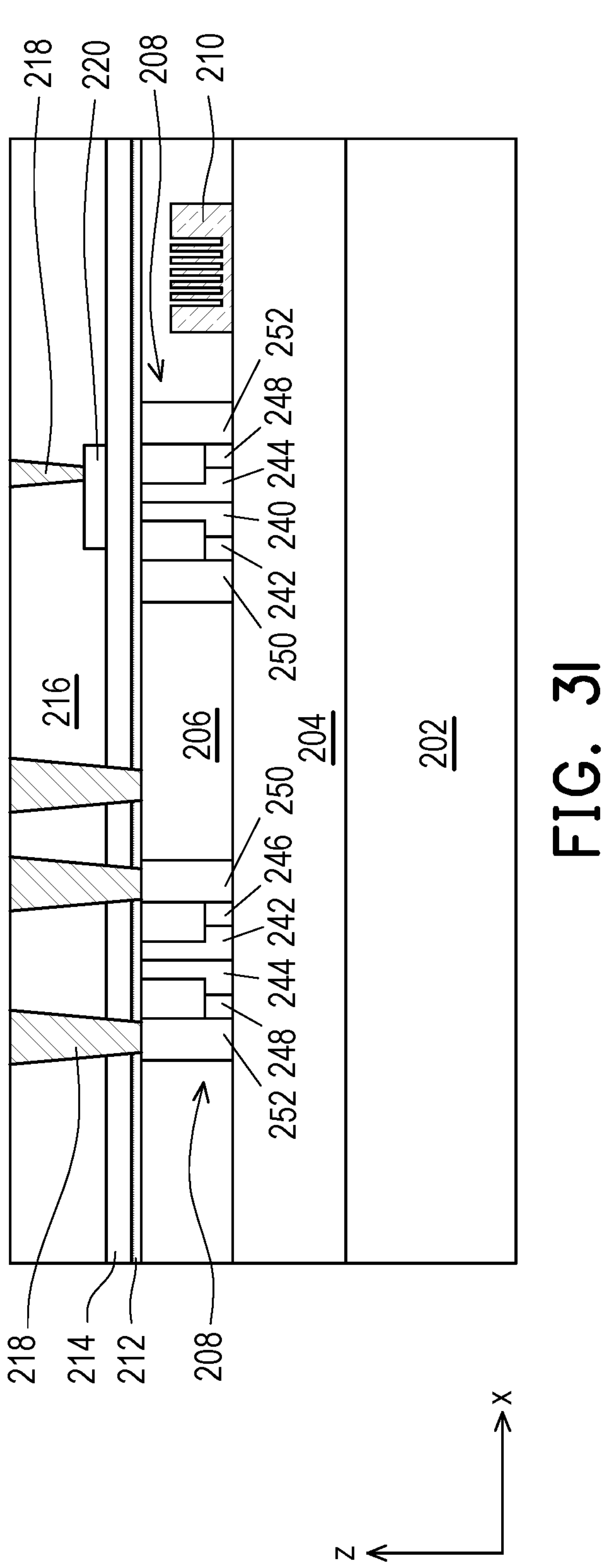
FIG. 3I

SEMICONDUCTOR PHOTONICS DEVICE AND METHODS OF FORMATION

CROSS-REFERENCE TO RELATED APPLICATION

This patent application claims priority to U.S. Provisional Patent Application No. 63/612,942, filed on Dec. 20, 2023, and entitled "SEMICONDUCTOR PHOTONICS DEVICE AND METHODS OF FORMATION." The disclosure of the prior application is considered part of and is incorporated by reference into this patent application.

BACKGROUND

A semiconductor device may be configured to use optical signals for high speed and secure data transmission between integrated circuits and/or semiconductor dies of the semiconductor device. An optical signal may be transferred through a waveguide in the semiconductor device. The waveguide enables confinement of the optical signal, which may reduce optical loss and increase propagation efficiency for the optical signal. Data may be encoded into an optical signal by modulating light into optical pulses through an optical modulator. The optical pulses are then transferred to the waveguide for propagation to other regions of the semiconductor device.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
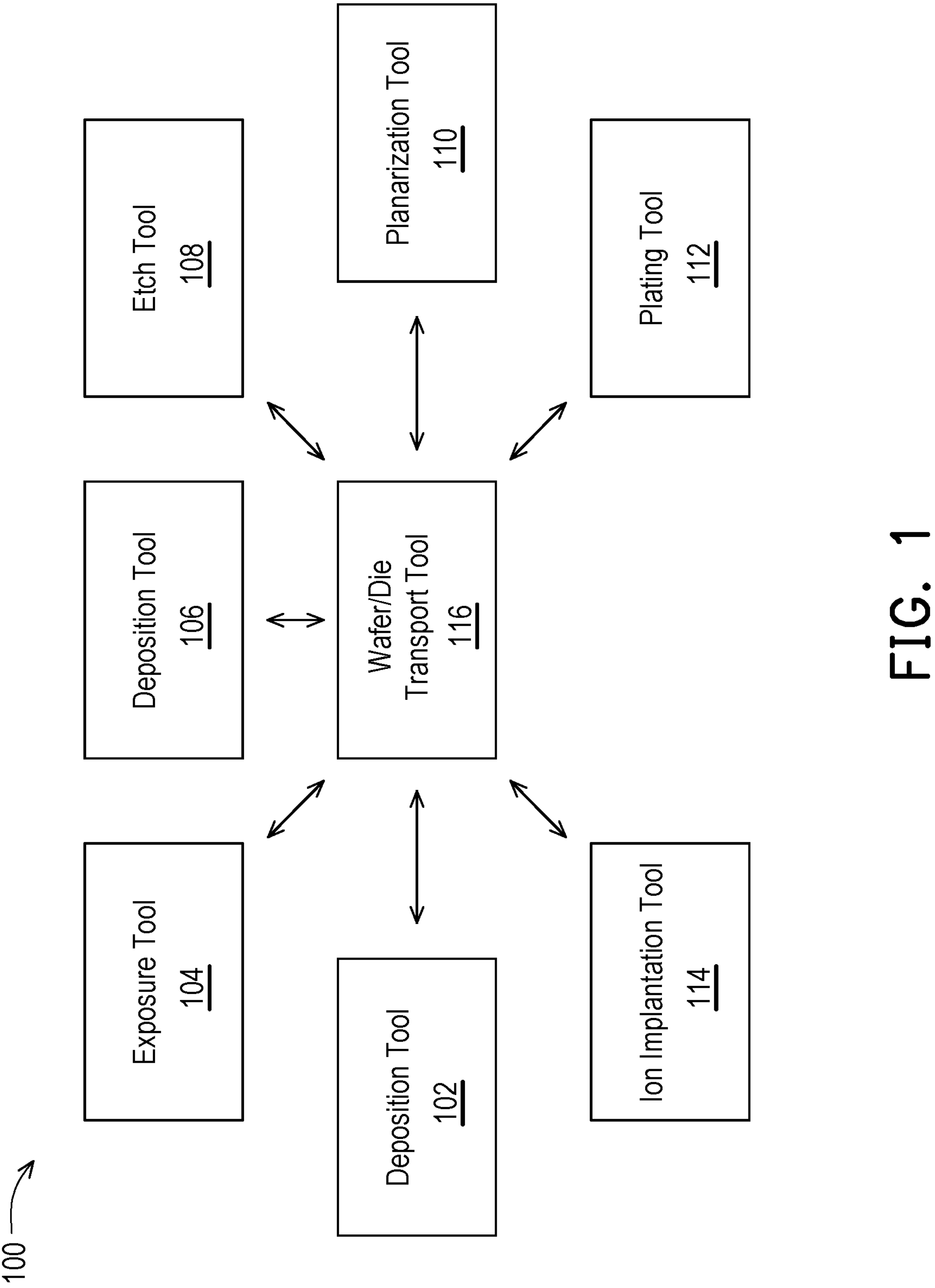
FIG. 1 is a diagram of an example environment in which systems and/or methods described herein may be implemented.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A photonic integrated circuit of a semiconductor photonics device may include a waveguide structure and an optical modulator structure. The waveguide structure and the optical modulator structure may be included in one or more dielectric layers of the semiconductor photonics device. The resonant wavelengths of the optical modulator structure may be sensitive to variations in processes and operating temperatures. To stabilize the resonant wavelengths of the optical modulator structure, a modulator heater structure may be located near the optical modulator structure to provide heat to the optical modulator structure. The heat provided by the modulator heater structure enables the operating temperature of the optical modulator structure to be maintained at a consistent operating temperature during operation of the semiconductor photonics device.

While some of the heat generated by the modulator heater structure is transferred to the optical modulator structure, the dielectric layer(s) surrounding the modulator heater structure also absorb heat generated by the modulator heater structure. The heat absorbed by the dielectric layer(s) results in thermal stress to the dielectric layer(s). In particular, the heat absorbed by the dielectric layer(s) may result in localized regions having different temperatures in the dielectric layer(s), and the regions of different temperatures may result in cracking, delamination, and/or another type of damage to the dielectric layer(s) due to the thermal stress caused by the regions of different temperatures. Additionally and/or alternatively, the heat absorbed by the dielectric layer(s) results in repeated rapid temperature cycling in the dielectric layer (s), which can degrade the structural integrity of the dielectric layer(s) over time. The localized regions of different temperatures and/or the repeated thermal cycling in the dielectric layer(s) may reduce the reliability of the semiconductor photonics device, may reduce the operational life of the semiconductor photonics device, and/or may cause the semiconductor photonics device to fail.

In some implementations described herein, a semiconductor photonics device includes an optical modulator structure and a modulator heater structure in one or more dielectric layers of the semiconductor photonics device. An isolation trench is included around the modulator heater structure to reduce the likelihood of damage to the dielectric layer(s) that might otherwise be caused by thermal stress. The isolation trench may include an air gap through the dielectric layer(s), and the air gap surrounds the modulator heater structure in a top-down view of the semiconductor photonics device. The isolation trench is sealed at the top of the isolation trench by a dielectric layer to prevent ingress of contaminants into the isolation trench.

The isolation trench reduces the amount of heat absorbed in the dielectric layer(s) in that the isolation trench thermally isolates the modulator heater structure from the dielectric layer(s). In particular, the isolation trench resists the transfer of heat from the modulator heater structure into the surrounding dielectric layer(s). This reduces the likelihood of cracking, delamination, and/or another type of damage to the dielectric layer(s) that might otherwise be caused by thermal stress to the dielectric layer(s).

The isolation trench has a round shape in the top-down view of the semiconductor photonics device, which further reduces the likelihood of cracking, delamination, and/or another type of damage to the dielectric layer(s) in that the round shape of the isolation trench prevents (or reduces the likelihood of) localized stresses from being accumulated at any particular location around the isolation trench.

FIG. 1 is a diagram of an example environment 100 in which systems and/or methods described herein may be implemented. As shown in FIG. 1, environment 100 may include a plurality of semiconductor processing tools 102-114 and a wafer/die transport tool 116. The plurality of semiconductor processing tools 102-114 may include a deposition tool 102, an exposure tool 104, a developer tool 106, an etch tool 108, a planarization tool 110, a plating tool 112, an ion implantation tool 114, and/or another type of semiconductor processing tool. The tools included in example environment 100 may be included in a semiconductor clean room, a semiconductor foundry, a semiconductor processing facility, and/or manufacturing facility, among other examples.

The deposition tool 102 is a semiconductor processing tool that includes a semiconductor processing chamber and one or more devices capable of depositing various types of materials onto a substrate. In some implementations, the deposition tool 102 includes a spin coating tool that is capable of depositing a photoresist layer on a substrate such as a wafer. In some implementations, the deposition tool 102 includes a chemical vapor deposition (CVD) tool such as a plasma enhanced CVD (PECVD) tool, a low pressure CVD (LPCVD) tool, a high-density plasma CVD (HDP-CVD) tool, a sub-atmospheric CVD (SACVD) tool, an atomic layer deposition (ALD) tool, a plasma-enhanced atomic layer deposition (PEALD) tool, or another type of CVD tool. In some implementations, the deposition tool 102 includes a physical vapor deposition (PVD) tool, such as a sputtering tool or another type of PVD tool. In some implementations, the example environment 100 includes a plurality of types of deposition tools 102.

The exposure tool 104 is a semiconductor processing tool that is capable of exposing a photoresist layer to a radiation source, such as an ultraviolet light (UV) source (e.g., a deep UV light source, an extreme UV light (EUV) source, and/or the like), an x-ray source, an electron beam (e-beam) source, and/or the like. The exposure tool 104 may expose a photoresist layer to the radiation source to transfer a pattern from a photomask to the photoresist layer. The pattern may include one or more semiconductor device layer patterns for forming one or more semiconductor devices, may include a pattern for forming one or more structures of a semiconductor device, may include a pattern for etching various portions of a semiconductor device, and/or the like. In some implementations, the exposure tool 104 includes a scanner, a stepper, or a similar type of exposure tool.

The developer tool 106 is a semiconductor processing tool that is capable of developing a photoresist layer that has been exposed to a radiation source to develop a pattern transferred to the photoresist layer from the exposure tool 104. In some implementations, the developer tool 106 develops a pattern by removing unexposed portions of a photoresist layer. In some implementations, the developer tool 106 develops a pattern by removing exposed portions of a photoresist layer. In some implementations, the developer tool 106 develops a pattern by dissolving exposed or unexposed portions of a photoresist layer through the use of a chemical developer.

The etch tool 108 is a semiconductor processing tool that is capable of etching various types of materials of a substrate, wafer, or semiconductor device. For example, the etch tool 108 may include a wet etch tool, a dry etch tool, and/or the like. In some implementations, the etch tool 108 includes a chamber that is filled with an etchant, and the substrate is placed in the chamber for a particular time period to remove particular amounts of one or more portions of the substrate. In some implementations, the etch tool 108 may etch one or more portions of the substrate using a plasma etch or a plasma-assisted etch, which may involve using an ionized gas to isotropically or directionally etch the one or more portions.

The planarization tool 110 is a semiconductor processing tool that is capable of polishing or planarizing various layers of a wafer or semiconductor device. For example, a planarization tool 110 may include a chemical mechanical planarization (CMP) tool and/or another type of planarization tool that polishes or planarizes a layer or surface of deposited or plated material. The planarization tool 110 may polish or planarize a surface of a semiconductor device with a combination of chemical and mechanical forces (e.g., chemical etching and free abrasive polishing). The planarization tool 110 may utilize an abrasive and corrosive chemical slurry in conjunction with a polishing pad and retaining ring (e.g., typically of a greater diameter than the semiconductor device). The polishing pad and the semiconductor device may be pressed together by a dynamic polishing head and held in place by the retaining ring. The dynamic polishing head may rotate with different axes of rotation to remove material and even out any irregular topography of the semiconductor device, making the semiconductor device flat or planar.

The plating tool 112 is a semiconductor processing tool that is capable of plating a substrate (e.g., a wafer, a semiconductor device, and/or the like) or a portion thereof with one or more metals. For example, the plating tool 112 may include a copper electroplating device, an aluminum electroplating device, a nickel electroplating device, a tin electroplating device, a compound material or alloy (e.g., tin-silver, tin-lead, and/or the like) electroplating device, and/or an electroplating device for one or more other types of conductive materials, metals, and/or similar types of materials.

The ion implantation tool 114 is a semiconductor processing tool that is capable of implanting ions into a substrate. The ion implantation tool 114 may generate ions in an arc chamber from a source material such as a gas or a solid. The source material may be provided into the arc chamber, and an arc voltage is discharged between a cathode and an electrode to produce a plasma containing ions of the source material. One or more extraction electrodes may be used to extract the ions from the plasma in the arc chamber and accelerate the ions to form an ion beam. The ion beam may be directed toward the substrate such that the ions are implanted below the surface of the substrate.

The wafer/die transport tool 116 may be included in a cluster tool or another type of tool that includes a plurality of processing chambers, and may be configured to transport substrates and/or semiconductor devices between the plurality of processing chambers, to transport substrates and/or semiconductor devices between a processing chamber and a buffer area, to transport substrates and/or semiconductor devices between a processing chamber and an interface tool such as an equipment front end module (EFEM), and/or to transport substrates and/or semiconductor devices between a processing chamber and a transport carrier (e.g., a front opening unified pod (FOUP)), among other examples. In some implementations, a wafer/die transport tool 116 may be included in a multi-chamber (or cluster) deposition tool 102, which may include a pre-clean processing chamber (e.g., for cleaning or removing oxides, oxidation, and/or other types of contamination or byproducts from a substrate and/or semiconductor device) and a plurality of types of deposition processing chambers (e.g., processing chambers for depositing different types of materials, processing chambers for performing different types of deposition operations).

In some implementations, one or more of the semiconductor processing tools 102-114 and/or the wafer/die transport tool 116 may be used to perform one or more semiconductor processing operations described herein. For example, one or more of the semiconductor processing tools 102-114 and/or the wafer/die transport tool 116 may be used to form an optical modulator structure in a semiconductor layer above a first dielectric layer of a semiconductor photonics device; may be used to form, above the first dielectric layer, a second dielectric layer that surrounds the optical modulator structure; may be used to form an etch stop layer over the second dielectric layer and over the optical modulator structure; may be used to form a first portion of a third dielectric layer over the etch stop layer; may be used to form, above the optical modulator structure, a modulator heater structure in the first portion of the third dielectric layer; may be used to form, above the first portion of the third dielectric layer and above the modulator heater structure, a second portion of the third dielectric layer and a plurality of dielectric layers; and/or may be used to form an isolation trench through the plurality of dielectric layers, through the third dielectric layer, and to the etch stop layer, where the isolation trench surrounds the modulator heater structure in a top view of the semiconductor photonics device, among other examples. One or more of the semiconductor processing tools 102-114 and/or the wafer/die transport tool 116 may be used to perform other semiconductor processing operations described herein, such as in connection with FIGS. 3A-3S and/or 5, among other examples.

The number and arrangement of devices shown in FIG. 1 are provided as one or more examples. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the example environment 100 may perform one or more functions described as being performed by another set of devices of the example environment 100.

Figure 2A:
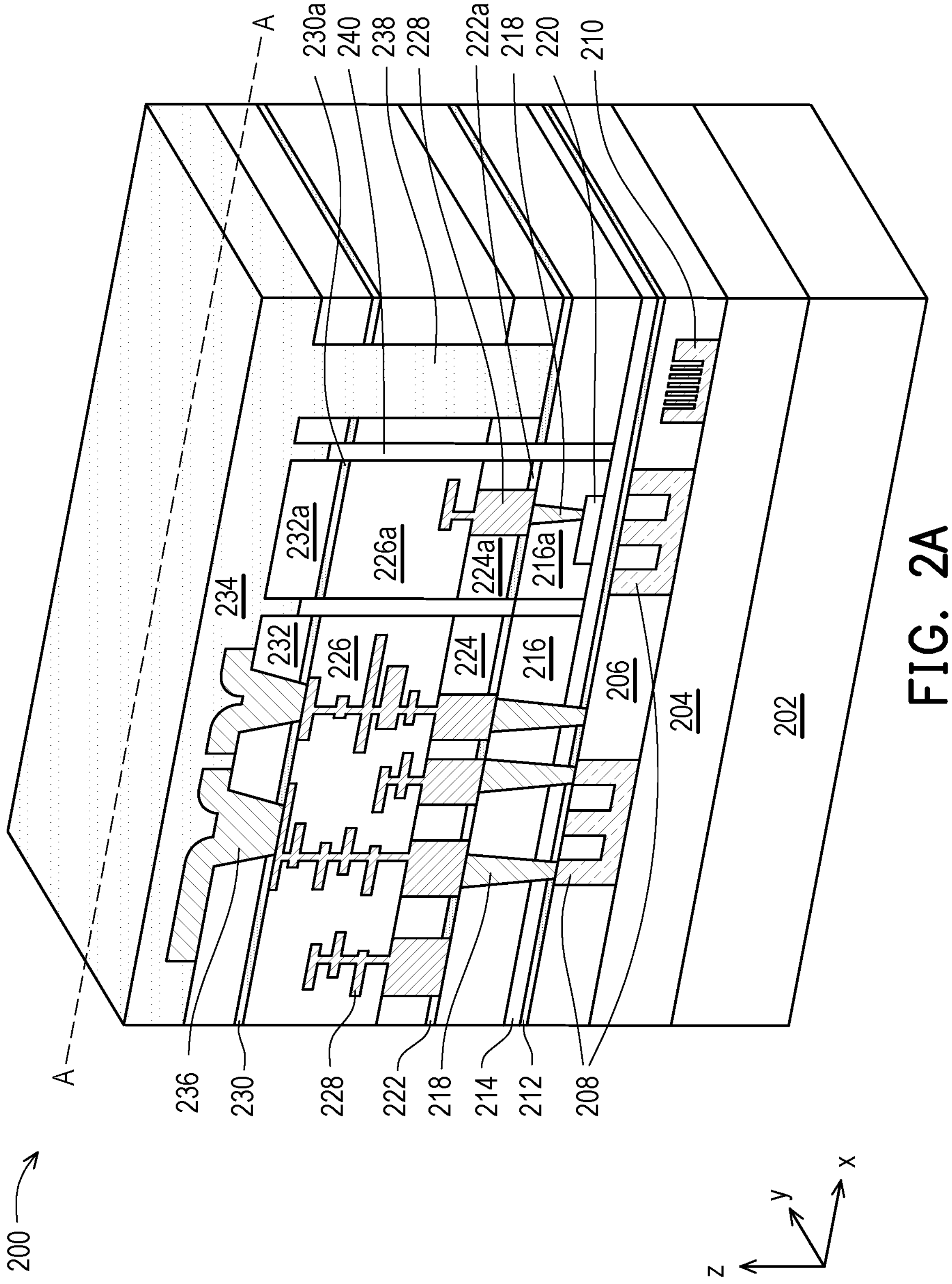
FIGS. 2A-2C are diagrams of an example semiconductor device described herein.
Figure 2B:
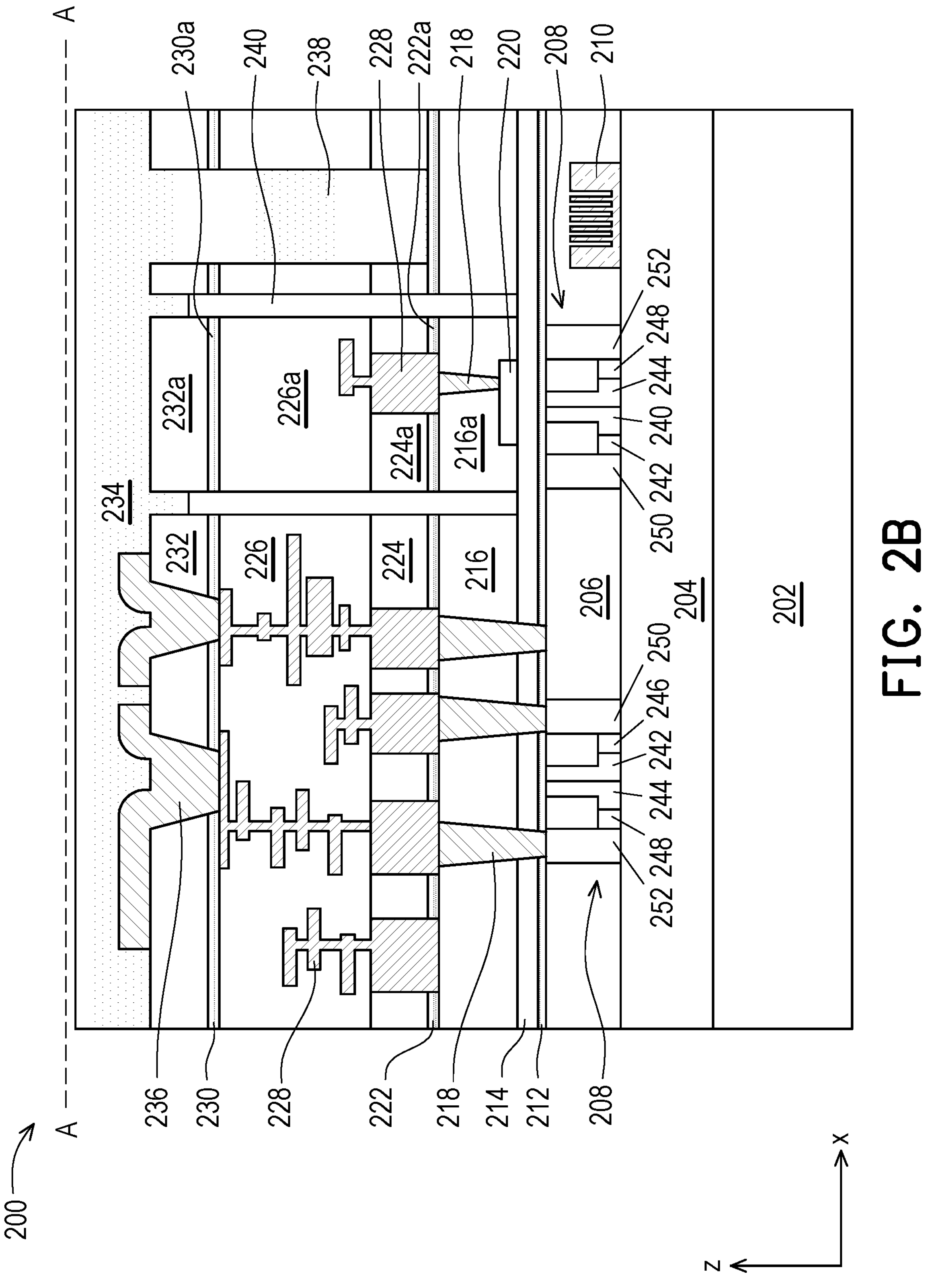
Figure 2C:
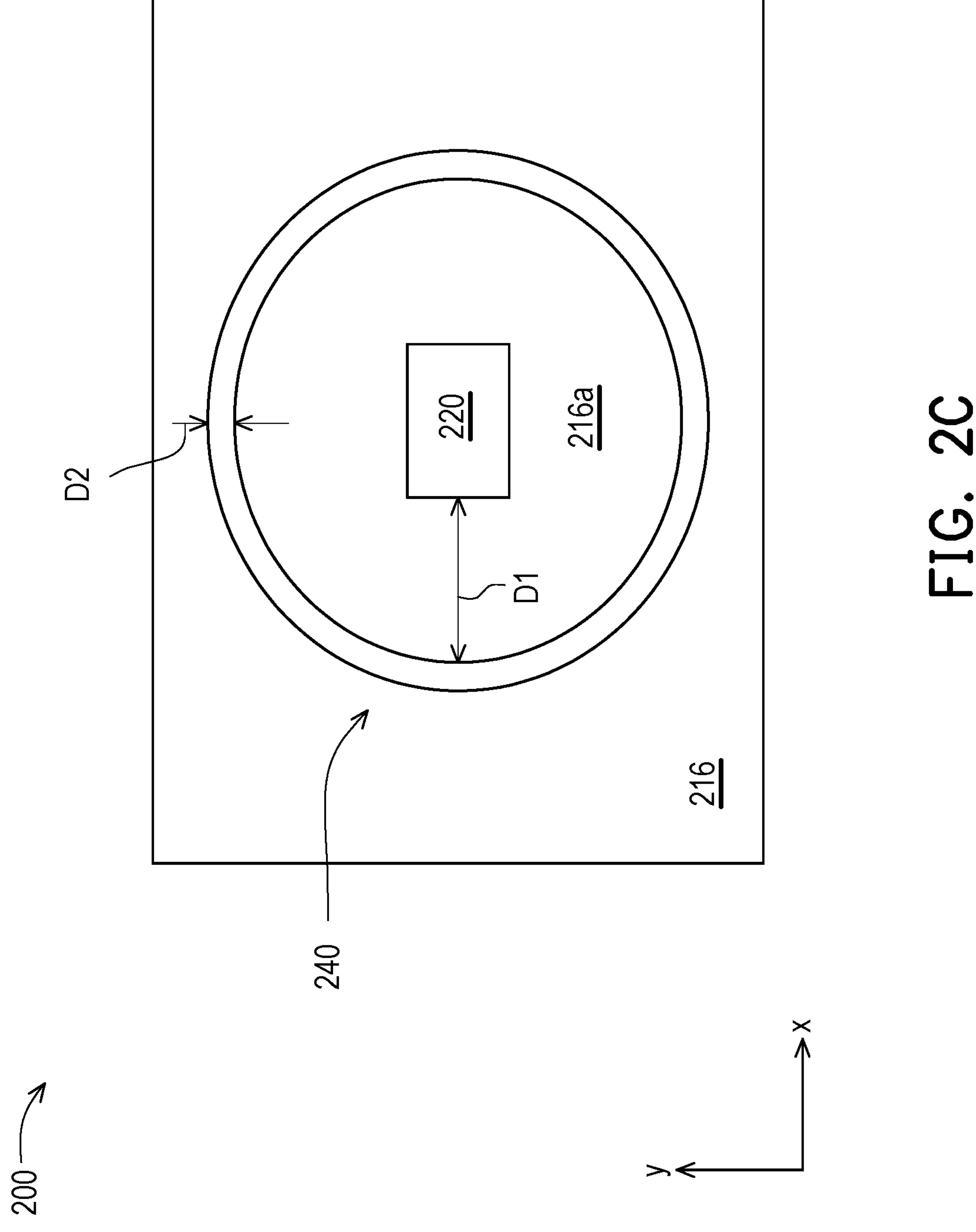

FIGS. 2A-2C are diagrams of an example semiconductor photonics device 200 described herein. The semiconductor photonics device 200 may include one or more photonic integrated circuits. The semiconductor photonics device 200 may be configured to use optical signals for high speed and secure data transmission between integrated circuits and/or semiconductor dies of the semiconductor photonics device 200 and/or between the semiconductor photonics device 200 and another device.

FIG. 2A illustrates a perspective view of the semiconductor photonics device 200. FIG. 2B illustrates a cross-sectional view of the semiconductor photonics device 200 along the line A-A in FIG. 2A. As shown in FIGS. 2A and 2B, the semiconductor photonics device 200 may include a substrate 202. The substrate 202 may be formed of silicon (Si), a material including silicon, a III-V compound semiconductor material such as gallium arsenide (GaAs), and/or another type of semiconductor material. The semiconductor photonics device 200 may further include a dielectric layer 204 over the substrate 202. The dielectric layer 204 may be referred to as a buried oxide (BOX) layer. The dielectric layer 204 may include one or more dielectric materials, such as a silicon oxide ($SiO_x$), a silicon nitride ($Si_xN_y$), a silicon oxynitride (SiON), tetraethyl orthosilicate oxide, phosphosilicate glass (PSG), borophosphosilicate glass (BPSG), fluorinated silica glass (FSG), carbon doped silicon oxide, and/or another dielectric material.

The semiconductor photonics device 200 may further include another dielectric layer 206 over the substrate 202. The dielectric layer 206 may include one or more dielectric materials, such as a silicon oxide ($SiO_x$), a silicon nitride ($Si_xN_y$), a silicon oxynitride (SiON), tetraethyl orthosilicate oxide, phosphosilicate glass (PSG), borophosphosilicate glass (BPSG), fluorinated silica glass (FSG), carbon doped silicon oxide, and/or another dielectric material.

The semiconductor photonics device 200 includes one or more photonic integrated circuit devices in the dielectric layer 206, such as an optical modulator structure 208, a grating coupler structure 210, and/or another photonic integrated circuit device such as a waveguide structure. Data may be encoded into an optical signal by modulating light into optical pulses in the optical modulator structure 208. The optical pulses are then transferred to the grating coupler structure 210 for propagation to other regions of the semiconductor photonics device 200 and/or to another device such as an optical fiber. Additionally and/or alternatively, the grating coupler structure 210 may receive an optical signal (e.g., from an optical fiber), and may transfer the optical signal to the optical modulator structure 208 for modulation.

The optical modulator structure 208 may include a semiconductor structure (e.g., a silicon (Si) structure and/or other type of semiconductor structure) that is doped with one or more types of dopants. In the example illustrated in FIGS. 2A and 2B, the optical modulator structure 208 includes a ring top view shape, and may be referred to as a micro-ring modulator (MRM) structure. Thus, FIGS. 2A and 2B illustrate a cross-section of the optical modulator structure 208 in which opposing sides of the ring shape of the optical modulator structure 208 are shown. Alternatively, the optical modulator structure 208 may include a Mach-Zehnder modulator (MZM) structure and/or another type of optical modulator structure.

The optical modulator structure 208 may function as a resonance chamber and may modulate an optical input signal from a light source to generate a modulated optical signal (e.g., a modulated light signal). An electrical input signal (e.g., a voltage, an electrical current) may be applied to the optical modulator structure 208 to modulate the optical input signal. The electrical input signal may be or may correspond to a stream of digital data (e.g., 1-values and 0-values). The optical modulator structure 208 may modulate the amplitude of the optical input signal, the phase of the optical input signal, the frequency of the optical input signal, and/or another property of the optical input signal based on the stream of digital data of the electrical input signal.

The grating coupler structure 210 may include a semiconductor structure (e.g., a silicon (Si) structure and/or other type of semiconductor structure). The grating coupler structure 210 may be configured to diffract or redirect an optical signal from an off-plane direction (e.g., a z-direction) in the semiconductor photonics device 200 to an in-plane direction (e.g., an x-direction, a y-direction) that is in the plane of the optical modulator structure 208. A grating coupler structure 210 may include a plurality of periodic gratings. The periodicity of the periodic gratings may be selected to achieve diffraction of one or more wavelengths of an optical signal. In some implementations, the periodicity of the periodic gratings may be selected based on the wavelength of the optical signal.

The semiconductor photonics device 200 includes one or more etch stop layers (ESLs) 212 and 214 over the dielectric layer 206 and above the optical modulator structure 208 and the grating coupler 210. The ESLs 212, 214 enable additional dielectric layers above the optical modulator structure 208 and the grating coupler structure 210 to be etched for forming additional structures above the optical modulator structure 208 and the grating coupler structure 210 without etching into the dielectric layer 206. In other words, the ESLs 212, 214 may protect the optical modulator structure 208 and the grating coupler structure 210 from damage in subsequent semiconductor processing operations. The ESLs 212, 214 may include one or more dielectric materials, such as a silicon oxide ($SiO_x$), a silicon nitride ($Si_xN_y$), a silicon oxynitride (SiON), tetraethyl orthosilicate oxide, phosphosilicate glass (PSG), borophosphosilicate glass (BPSG), fluorinated silica glass (FSG), carbon doped silicon oxide, and/or another dielectric material. The ESLs 212, 214 may include dielectric materials that are different from other dielectric layers in the semiconductor photonics device 200 to provide etch selectivity for the ESLs 212, 214 relative to the other dielectric layers.

Another dielectric layer 216 may be included over the ESLs 212, 214. The dielectric layer 216 may include one or more dielectric materials, such as a silicon oxide ($SiO_x$), a silicon nitride ($Si_xN_y$), a silicon oxynitride (SiON), tetraethyl orthosilicate oxide, phosphosilicate glass (PSG), borophosphosilicate glass (BPSG), fluorinated silica glass (FSG), carbon doped silicon oxide, and/or another dielectric material.

A plurality of contact structures 218 are included in and/or through the ESLs 212, 214. Moreover, the contact structures 218 are included in and/or through the dielectric layer 216. The contact structures 218 are electrically coupled and/or physically coupled with the optical modulator structure 208, and enable electrical input signals to be provided to the optical modulator structure 208. The contact structures 218 may each include tungsten (W), cobalt (Co), ruthenium (Ru), titanium (Ti), aluminum (Al), copper (Cu) or gold (Au), among other examples of conductive materials. The contact structures 218 may each include vias, trenches, contact plugs, and/or another type of conductive structures.

As further shown in FIGS. 2A and 2B, the semiconductor photonics device 200 includes a modulator heater structure 220 above the optical modulator structure 208 in the z-direction in the semiconductor photonics device 200. The modulator heater structure 220 may be included on the ESL 214 and in the dielectric layer 216. As described above, the resonant wavelengths of the optical modulator structure 208 may be sensitive to variations in operating temperature. Thus, the modulator heater structure 220 may be configured to stabilize the operating temperature of the optical modulator structure 208 during operation of the optical modulator structure 208. In particular, the modulator heater structure 220 may heat (e.g., may increase the temperature of) the optical modulator structure 208 to an operating temperature setpoint, thereby stabilizing the operating performance of the optical modulator structure 208. In some implementations, the modulator heater structure 220 is configured to maintain the operating temperature of the optical modulator structure 208 by modulating the temperature of the heat provided to the optical modulator structure 208. For example, the temperature of the modulator heater structure 220 may be modulated in a range of approximately 100 degrees Celsius to approximately 800 degrees Celsius to maintain the operating temperature of the optical modulator structure 208 at or within a temperature threshold of the operating temperature setpoint for the optical modulator structure 208. However, other values for the range are within the scope of the present disclosure.

The modulator heater structure 220 may include tungsten (W), titanium (Ti), titanium nitride (TiN), tantalum nitride (TaN), titanium tungsten (TiW), tantalum (Ta), copper (Cu), aluminum (Al), cobalt (Co), ruthenium (Ru), molybdenum (Mo), and/or another material that is capable of radiating heat through the ESLs 212, 214 to heat the optical modulator structure 208. The modulator heater structure 220 may be electrically coupled and/or physically coupled with one or more contact structures 218 that are included in the dielectric layer 216. The contact structure(s) 218 enable an electrical input (e.g., a voltage, a current) that may be dissipated in the modulator heater structure 220, which converts the electrical input to a thermal output (e.g., heat).

A plurality of dielectric layers are included above and/or over the dielectric layer 216 and the contact structures 218. The plurality of dielectric layers may include an ESL 222 over and/or on the dielectric layer 216, a dielectric layer 224 over and/or on the ESL 222, and/or a dielectric layer 226 over and/or on the dielectric layer 224, among other examples. The ESL 222 and the dielectric layers 224 and 226 may each include one or more dielectric materials, such as a silicon oxide ($SiO_x$), a silicon nitride ($Si_xN_y$), a silicon oxynitride (SiON), tetraethyl orthosilicate oxide, phosphosilicate glass (PSG), borophosphosilicate glass (BPSG), fluorinated silica glass (FSG), carbon doped silicon oxide, and/or another suitable dielectric material.

The contact structures 218 that are coupled with the optical modulator structure 208 and the modulator heater structure 220 may be electrically coupled and/or physically coupled with one or more metallization layers 228. The metallization layers 228 may each be included in, and may extend through, ESL 222, the dielectric layer 224, and/or the dielectric layer 226. The metallization layers 228 may each include tungsten (W), cobalt (Co), ruthenium (Ru), titanium (Ti), aluminum (Al), copper (Cu) or gold (Au), among other examples of conductive materials. The metallization layers 228 may each include vias, trenches, contact plugs, and/or another type of metallization layers.

As further shown in FIGS. 2A and 2B, the semiconductor photonics device 200 includes additional dielectric layers above and/or over the dielectric layer 226. For example, an ESL 230 may be included over and/or on the dielectric layer 226. As another example, a passivation layer 232 may be included over and/or on the ESL 230. As another example, a dielectric layer 234 is included over and/or on the passivation layer 232. The ESL 230, the passivation layer 232, and the dielectric layer 234 each include one or more dielectric materials, such as a silicon oxide ($SiO_x$), a silicon nitride ($Si_xN_y$), a silicon oxynitride (SiON), tetraethyl orthosilicate oxide, phosphosilicate glass (PSG), borophosphosilicate glass (BPSG), fluorinated silica glass (FSG), carbon doped silicon oxide, and/or another dielectric material. In some implementations, the passivation layer 232 includes one or more polymer layers.

Metal pads 236 may be included in, and/or may extend through, the ESL 230, the passivation layer 232, and/or the dielectric layer 234. In some implementations, the dielectric layer 234 is included over and/or on the metal pads 236. The metal pads 236 may include aluminum (Al) pads, copper (Cu) pads, and/or another type of metal pads. The metal pads 236 may be electrically coupled and/or physically coupled with one or more of the metallization layers 228.

A portion of the dielectric layer 234 extends in the z-direction into and/or through the dielectric layer 224, the dielectric layer 226, the ESL 230, and the passivation layer 232. The portion of the dielectric layer 234 includes a grating coupler transmission region 238 that is located above the grating coupler structure 210 in the z-direction in the semiconductor photonics device 200. The grating coupler transmission region 238 provides a region through which optical signals may be transmitted to and/or from the grating coupler structure 210. In some implementations, an optical fiber may be inserted into the grating coupler transmission region 238, and the dielectric layer 234 encapsulates the optical fiber in the grating coupler transmission region 238. In some implementations, the grating coupler transmission region 238 is fully filled in with dielectric material that merges with the dielectric layer 234, and the optical fiber is coupled with a top surface of the dielectric layer 234 above the grating coupler transmission region 238.

As further shown in FIGS. 2A and 2B, the semiconductor photonics device 200 includes an isolation trench 240. The isolation trench 240 is included on opposing sides of the modulator heater structure 220 in the views in FIGS. 2A and 2B. The isolation trench 240 is included around the modulator heater structure 220 in a top view of the modulator heater structure 220 such that the isolation trench 240 surrounds the modulator heater structure 220 in a top view of the modulator heater structure 220. The isolation trench 240 is included in, and/or extends through, the dielectric layer 216, the ESL 222, the dielectric layer 224, the dielectric layer 226, the ESL 230, and/or the passivation layer 232. The top opening of the isolation trench 240 is sealed by the dielectric layer 234, which prevents contaminants from entering the isolation trench 240. Thus, portions of the dielectric layer 234 may extend into a portion of the top opening of the isolation trench 240. The grating coupler transmission region 238 extends along a side the isolation trench 240.

The isolation trench 240 is terminated on the ESL 214, and therefore the isolation trench 240 does not extend into the ESL 212 and/or the underlying dielectric layer 206 around the optical modulator structure 208. This enables optical signals to be transferred between the optical modulator structure 208 and the grating coupler structure 210 (and other photonic integrated circuit components) without being interfered with by the isolation trench 240. Moreover, this enables the ESL 214 to function as an etch stop layer when etching the dielectric layers to form the isolation trench 240, which reduces the processing time and complexity of forming the isolation trench 240 as compared to the isolation trench 240 being formed into the dielectric layer 206.

The isolation trench 240 may be filled with a dielectric gas, such as atmospheric air or residual processing gases (e.g., nitrogen ($N_2$), argon (Ar)) from semiconductor processing operations that are performed to form the isolation trench 240 and/or the dielectric layer 234. The isolation trench 240 creates an isolation region in the dielectric layers around and above the modulator heater structure 220. The isolation region is thermally and/or mechanically isolated from other portions of the dielectric layers. The isolation region may include a thermally isolated portion 216*a* of the dielectric layer 216, a thermally isolated portion 222*a* of the ESL 222, a thermally isolated portion 224*a* of the dielectric layer 224, a thermally isolated portion 226*a* of the dielectric layer 226, a thermally isolated portion 230*a* of the ESL 230, and a thermally isolated portion 232*a* of the passivation layer 232, among other examples.

The isolation trench 240 functions as a thermal isolation trench and/or a stress isolation trench. For example, the isolation trench 240 acts as a thermal barrier that prevents (or reduces the likelihood or amount of) heat from the modulator heater structure 220 from being dissipated past the isolated portions 216*a*, 222*a*, 224*a*, 226*a*, 230*a*, and 232*a*, and further into the dielectric layers 216, 224, 226, the ESLs 222 and 230, and the passivation layer 232. Thus, the isolation trench 240 prevents or reduces the likelihood of cracking, delamination, and/or another type of damage to the dielectric layers 216, 224, 226, the ESLs 222 and 230, and the passivation layer 232. In particular, the heat provided by the modulator heater structure 220 may be modulated to maintain a consistent operating temperature for the optical modulator structure 208, and this heat modulation (or thermal cycling) might otherwise cause fatigue that can lead to cracking, delamination, and/or another type of damage to the dielectric layers 216, 224, 226, the ESLs 222 and 230, and the passivation layer 232 if the isolation trench 240 were not included. Additionally, the isolation trench 240 also functions as a stress isolation trench in that the isolation trench 240 prevents (or reduces the likelihood of) cracking, delamination, and/or another type of damage in the isolated portions 216*a*, 222*a*, 224*a*, 226*a*, 230*a*, and 232*a* from propagating into the dielectric layers 216, 224, 226, the ESLs 222 and 230, and the passivation layer 232.

The thermal isolation and/or stress isolation provided by the isolation trench 240 enables the metallization layers 228 and/or the grating coupler transmission region 238 to be positioned closer to modulator heater structure 220 in the x-y plane in the semiconductor photonics device 200 as compared to the isolation trench 240 not being included around the modulator heater structure 220. One or more design parameters for the semiconductor photonics device 200 may specify a minimum distance (e.g., a keep out zone (KOZ)) between the metallization layers 228 (and other structures in the semiconductor photonics device 200 such as the grating coupler transmission region 238) from the modulator heater structure 220 so that a reliability parameter can be achieved for the semiconductor photonics device 200. The minimum distance may be based on the distance and magnitude of thermal propagation of heat from the modulator heater structure 220 into the dielectric layers 216, 224, 226, the ESLs 222 and 230, and the passivation layer 232. Since the isolation trench 240 reduces the distance and/or magnitude of thermal propagation of heat from the modulator heater structure 220 into the dielectric layers 216, 224, 226, the ESLs 222 and 230, and the passivation layer 232, the isolation trench 240 enables the metallization layers 228 (and other structures in the semiconductor photonics device 200 such as the grating coupler transmission region 238) to be positioned closer to the modulator heater structure 220 without adversely affecting the reliability of the semiconductor photonics device 200. Thus, the isolation trench 240 may enable the size (e.g., the size in the x-y plane) of the semiconductor photonics device 200 to be reduced and/or the density of structures in the semiconductor photonics device 200 to be increased.

As shown in FIG. 2B, an optical modulator structure 208 may include one or more doped regions. The one or more doped regions may facilitate and/or promote the flow of electrons in the optical modulator structure 208 and/or may facilitate and/or promote modulation of an optical input signal from an electrical input signal. For example, the one or more doped regions may be configured as a p-n junction that is configured to generate a modulated optical signal. When the electrical input signal is applied to the p-n junction of the optical modulator structure 208, a junction depletion width of the p-n junction is modified. This results in changes in concentrations of electrons and holes within the optical modulator structure 208. The changes in concentrations of electrons and holes may lead to changes of the effective refractive index of the optical modulator structure 208, which may modulate the light intensity of the optical input signal within the optical modulator structure 208, thereby enabling the electrical input signal to be translated to the modulated optical signal.

The one or more doped regions may include silicon (and/or another semiconductor material) that is doped with one or more types of dopants, such as n-type dopants and/or p-type dopants. For example, the optical modulator structure 208 may include a p− doped region 242 that is doped with p-type ions. The p-type ions may include a p-type material (e.g., boron (B) or germanium (Ge), among other examples). As another example, the optical modulator structure 208 may include an n-doped region 244 that is doped with n-type ions. The n-type ions may include an n-type material (e.g., phosphorous (P) or arsenic (As), among other examples). The n-doped region 244 and the p− doped region 242 may be adjacent and/or physically coupled, and may correspond to the p-n junction of the optical modulator structure 208.

The optical modulator structure 208 may further include a p doped region 246 adjacent to the p− doped region 242. The p doped region 246 may include p-type ions including a p-type material (e.g., boron (B) or germanium (Ge), among other examples). The optical modulator structure 208 may further include an n doped region 248 adjacent to the n-doped region 244. The n doped region 248 may include n-type ions including an n-type material (e.g., phosphorous (P) or arsenic (As), among other examples).

The optical modulator structure 208 may further include a p+ doped region 250 adjacent to the p doped region 246. The p+ doped region 250 may include p-type ions including a p-type material (e.g., boron (B) or germanium (Ge), among other examples). The optical modulator structure 208 may further include an n+ doped region 252 adjacent to the n doped region 248. The n+ doped region 252 may include n-type ions including an n-type material (e.g., phosphorous (P) or arsenic (As), among other examples).

The p− doped region 242, the p doped region 246, and the p+ doped region 250 may each include a different p-type dopant concentration. The different p-type dopant concentrations result in a dopant gradient between the center of the optical modulator structure 208 and an outer wall of the optical modulator structure 208. The p-type dopant concentration in the p+ doped region 250 may be greater relative to the p-type dopant concentration in the p doped region 246, and the p-type dopant concentration in the p doped region 246 may be greater relative to the p-type dopant concentration in the p− doped region 242. For example, the p− doped region 242 may include a p-type dopant concentration that is included in a range of approximately $1\times e^{17}$ p-type ions/$cm^3$ to approximately $5\times e^{18}$ p-type ions/$cm^3$. However, other values for the range are within the scope of the present disclosure. As another example, the p doped region 246 may include a p-type dopant concentration that is included in a range of approximately $1\times e^{19}$ p-type ions/$cm^3$ to approximately $1\times e^{20}$ p-type ions/$cm^3$. However, other values for the range are within the scope of the present disclosure. As another example, the p+ doped region 250 may include a p-type dopant concentration that is included in a range of approximately $1\times e^{20}$ p-type ions/$cm^3$ to approximately $5\times e^{20}$ p-type ions/$cm^3$. However, other values for the range are within the scope of the present disclosure.

The n-doped region 244, the n doped region 248, and the n+ doped region 252 may each include a different n-type dopant concentration. The different n-type dopant concentrations result in a dopant gradient between the center of the optical modulator structure 208 and an inner wall of the optical modulator structure 208. The n-type dopant concentration in the n+ doped region 252 may be greater relative to the n-type dopant concentration in the n doped region 248, and the n-type dopant concentration in the n doped region 248 may be greater relative to the n-type dopant concentration in the n-doped region 244. For example, the n-doped region 244 may include an n-type dopant concentration that is included in a range of approximately $1\times e^{17}$ n-type ions/$cm^3$ to approximately $5\times e^{18}$ n-type ions/$cm^3$. However, other values for the range are within the scope of the present disclosure. As another example, the n doped region 248 may include a n-type dopant concentration that is included in a range of approximately $1\times e^{19}$ n-type ions/$cm^3$ to approximately $1\times e^{20}$ n-type ions/$cm^3$. However, other values for the range are within the scope of the present disclosure. As another example, the n+ doped region 252 may include an n-type dopant concentration that is included in a range of approximately $1\times e^{20}$ n-type ions/$cm^3$ to approximately $5\times e^{20}$ n-type ions/$cm^3$. However, other values for the range are within the scope of the present disclosure.

FIG. 2C illustrates a top-down view of a cross-section of a portion of the semiconductor photonics device 200 in the x-y plane of the semiconductor photonics device 200. As shown in FIG. 2C, the isolation trench 240 is included around the modulator heater structure 220 in a top-down view of the semiconductor photonics device 200 such that the isolation trench 240 surrounds the modulator heater structure 220 in a top view of the modulator heater structure 220. The isolation trench 240 has a rounded top view shape, such as a ring top view shape (e.g., a ring-shaped air gap) or a circular top view shape, in the top-down view of the semiconductor photonics device 200. The rounded top view shape prevents (or reduces the likelihood of) localized stresses from being accumulated at any particular location around the isolation trench 240.

As further shown in FIG. 2C, the semiconductor photonics device 200 includes one or more dimensions, such as a dimension D1 and a dimension D2, among other examples. The dimension D1 corresponds to a distance between the modulator heater structure 220 and the isolation trench 240. Thus, the dimension D1 also corresponds to a width of the isolated portions 216*a*, 222*a*, 224*a*, 226*a*, 230*a*, and 232*a* between the modulator heater structure 220 and the isolation trench 240. In some implementations, the dimension D1 is included in a range of approximately 10 microns to approximately 20 microns. If the dimension D1 is less than approximately 10 microns, process variation in the process for etching the dielectric layers 216, 224, 226, the ESLs 222 and 230, and the passivation layer 232 to form the isolation trench 240 may result in etching into the modulator heater structure 220. This may cause damage to the modulator heater structure 220 and/or may render the modulator heater structure 220 inoperable. If the dimension D1 is greater than approximately 20 microns, the isolated portions 216*a*, 222*a*, 224*a*, 226*a*, 230*a*, and 232*a* may be too large, which may result in cracking, delamination, and/or another type of damage to the isolated portions 216*a*, 222*a*, 224*a*, 226*a*, 230*a*, and/or 232*a*. If the dimension D1 is included in a range of approximately 10 microns to approximately 20 microns, the isolation trench 240 may be formed without etching into the modulator heater structure 220 while reducing the likelihood of cracking, delamination, and/or another type of damage to the isolated portions 216*a*, 222*a*, 224*a*, 226*a*, 230*a*, and/or 232*a*. However, other values for the dimension D1, and ranges other than approximately 10 microns to approximately 20 microns, are within the scope of the present disclosure.

The dimension D2 corresponds to a width of the isolation trench 240. Thus, the dimension D2 also corresponds to a distance between the isolated portions 216*a*, 222*a*, 224*a*, 226*a*, 230*a*, and 232*a* and the other regions of the dielectric layers 216, 224, 226, the ESLs 222 and 230, and the passivation layer 232. In some implementations, the dimension D2 is included in a range of approximately 5 microns to approximately 15 microns. If the dimension D2 is less than approximately 5 microns, the isolation trench 240 may be too narrow to enable the etchants used to etch the isolation trench 240 to be fully removed from the isolation trench 240. This may result in residual etchants contaminating the dielectric layers 216, 224, 226, the ESLs 222 and 230, and/or the passivation layer 232 through the isolation trench 240. If the dimension D2 is greater than approximately 15 microns, etch loading in the isolation trench 240 may occur, which may result in an uncontrollable etch rate when etching the isolation trench 240. This may result in over etching (e.g., etching through the ESLs 212, 214 and into the underlying dielectric layer 206). If the dimension D2 is included in a range of approximately 5 microns to approximately 15 microns, a low likelihood of over etching may be achieved and a high likelihood of full etchant removal may be achieved when etching the isolation trench 240. However, other values for the dimension D2, and ranges other than approximately 5 microns to approximately 15 microns, are within the scope of the present disclosure.

As indicated above, FIGS. 2A-2C are provided as an example. Other examples may differ from what is described with regard to FIGS. 2A-2C.

Figure 3F:
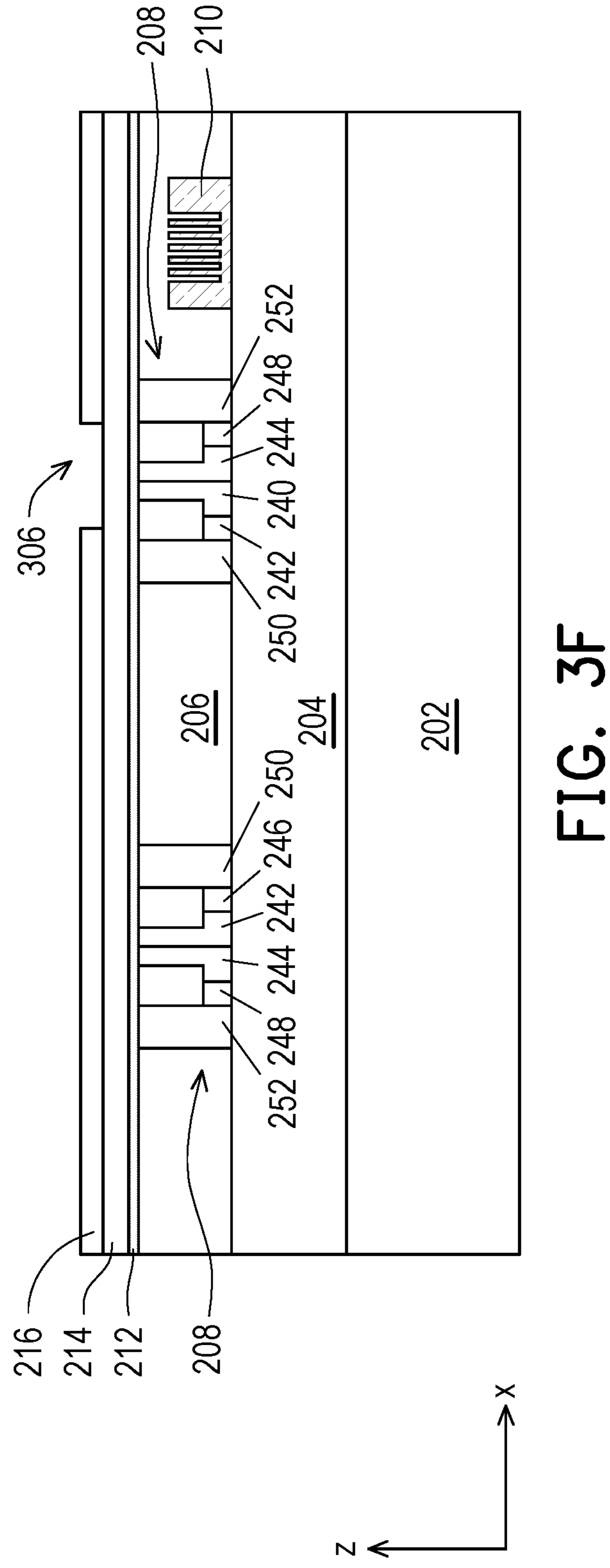
FIGS. 3A-3S are diagrams of an example implementation of forming the semiconductor device (or a portion thereof) described herein.
Figure 3H:
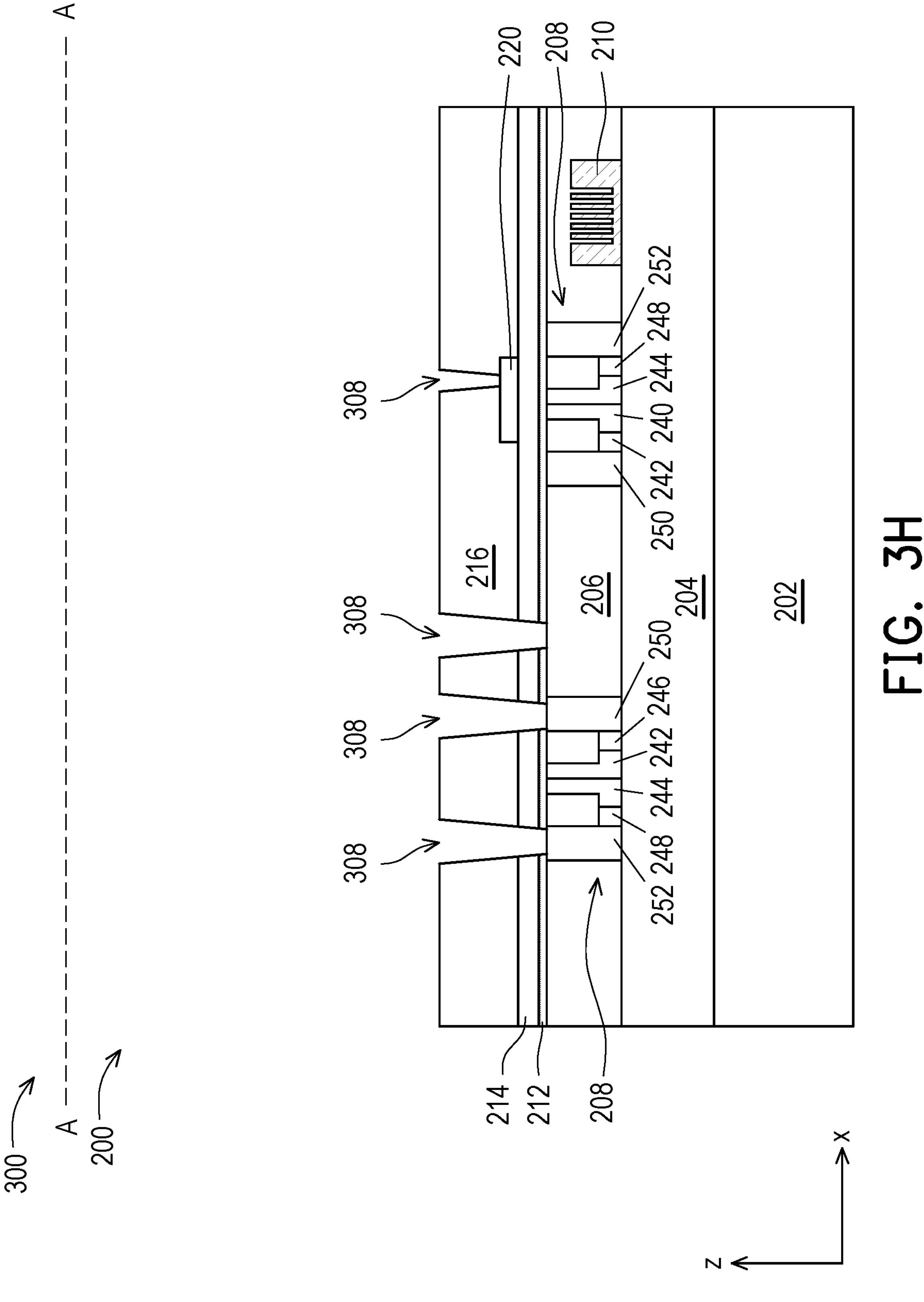
Figure 3J:
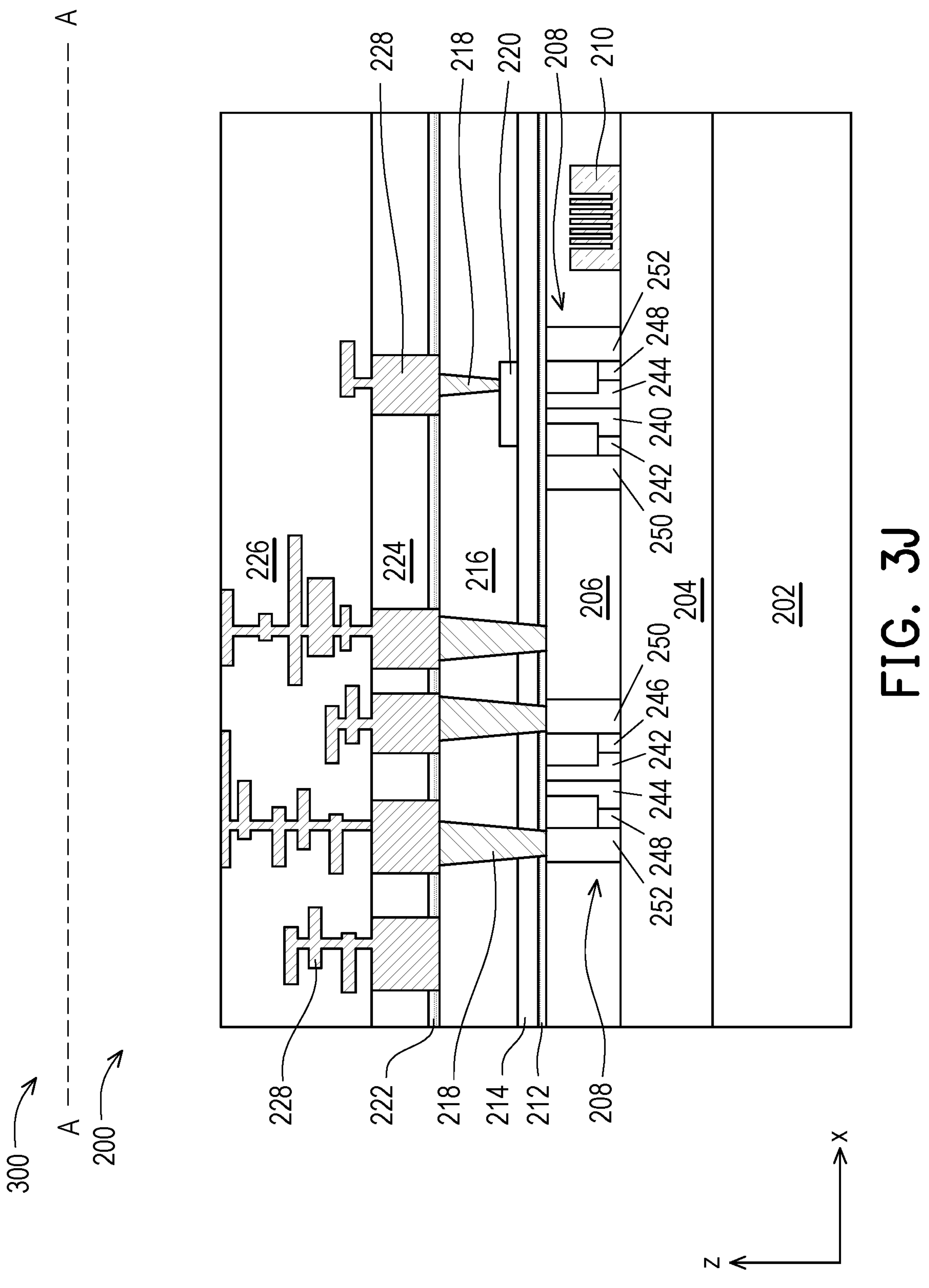
Figure 3K:
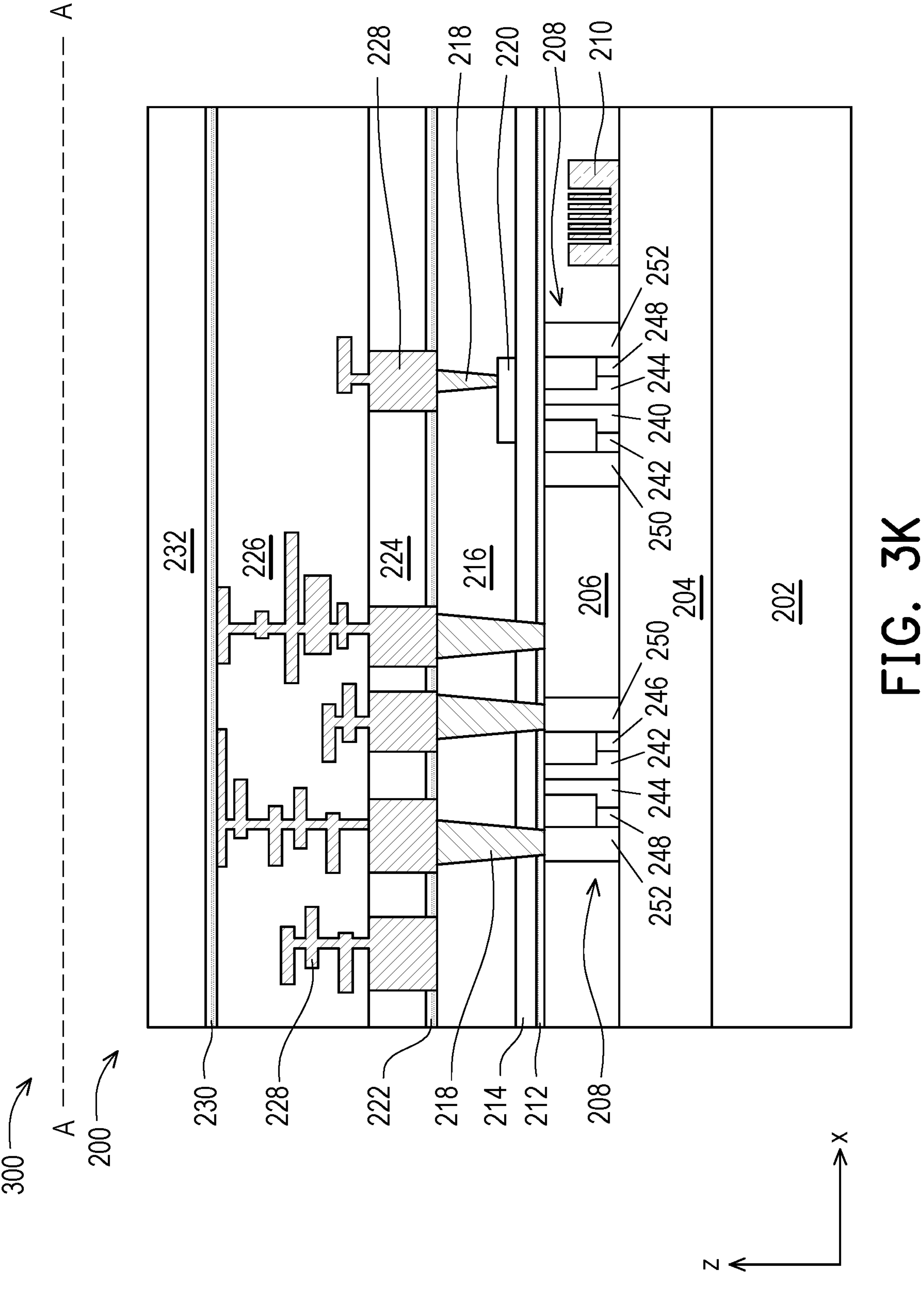
Figure 3L:
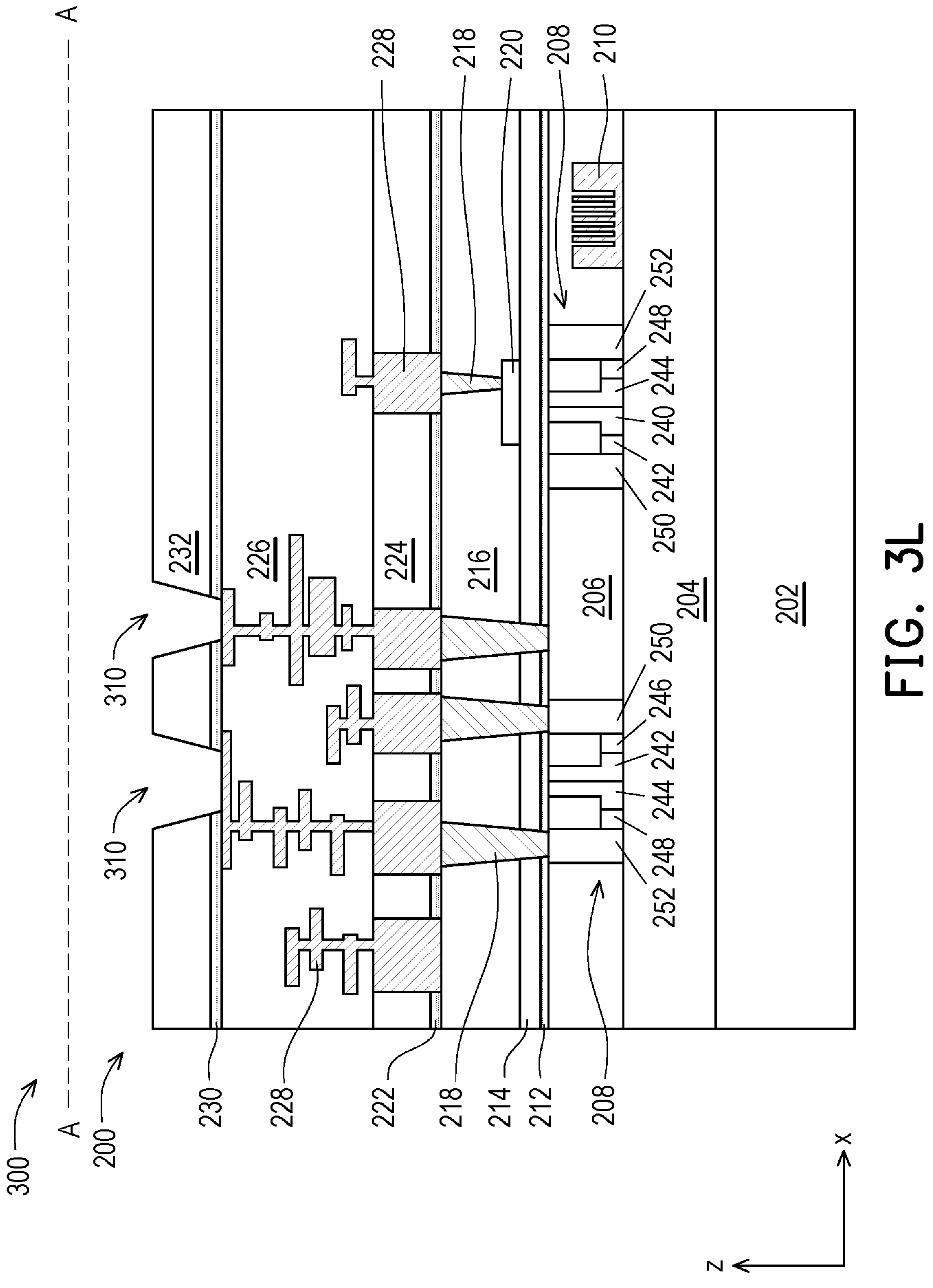
Figure 3M:
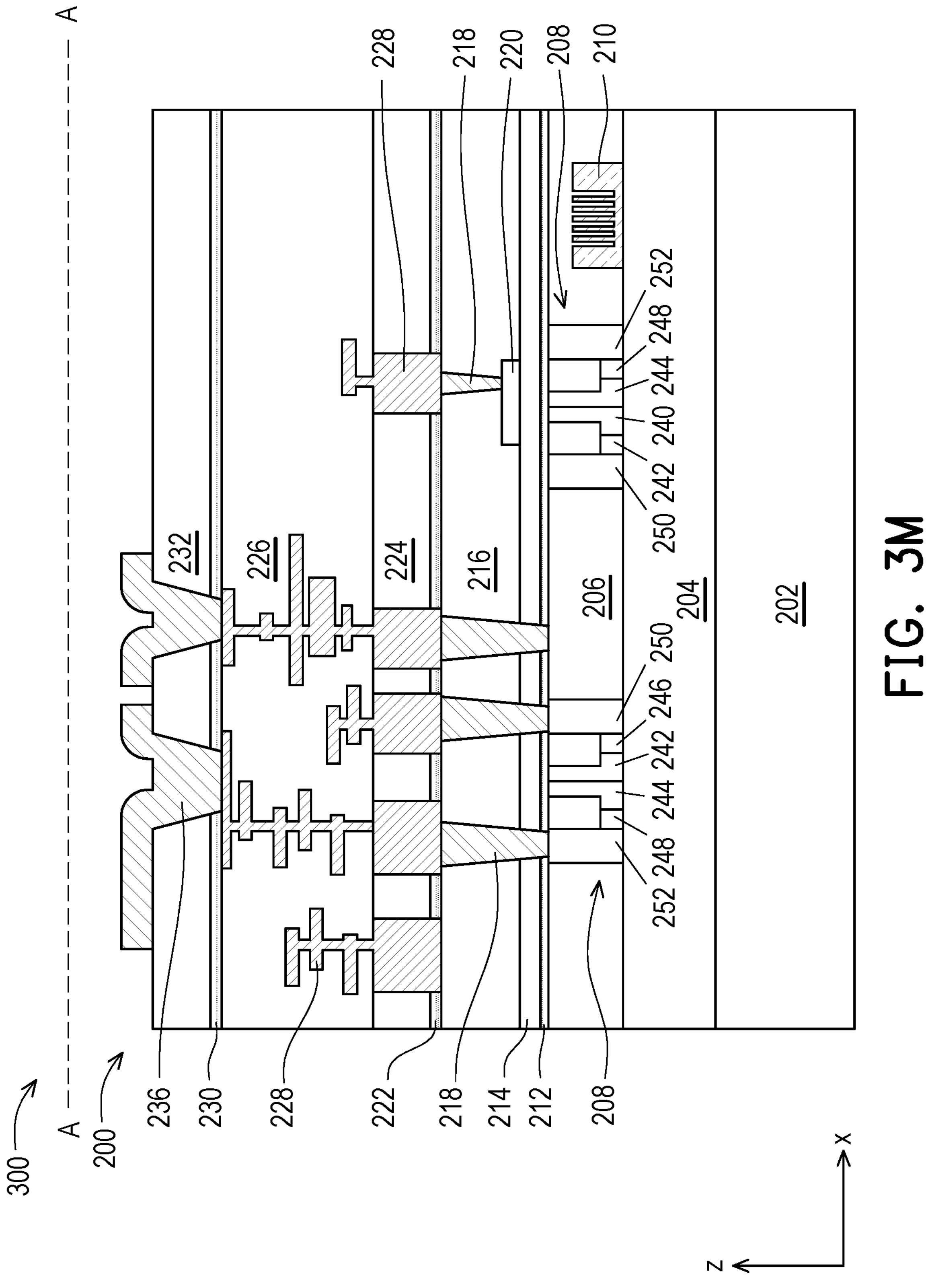
Figure 3N:
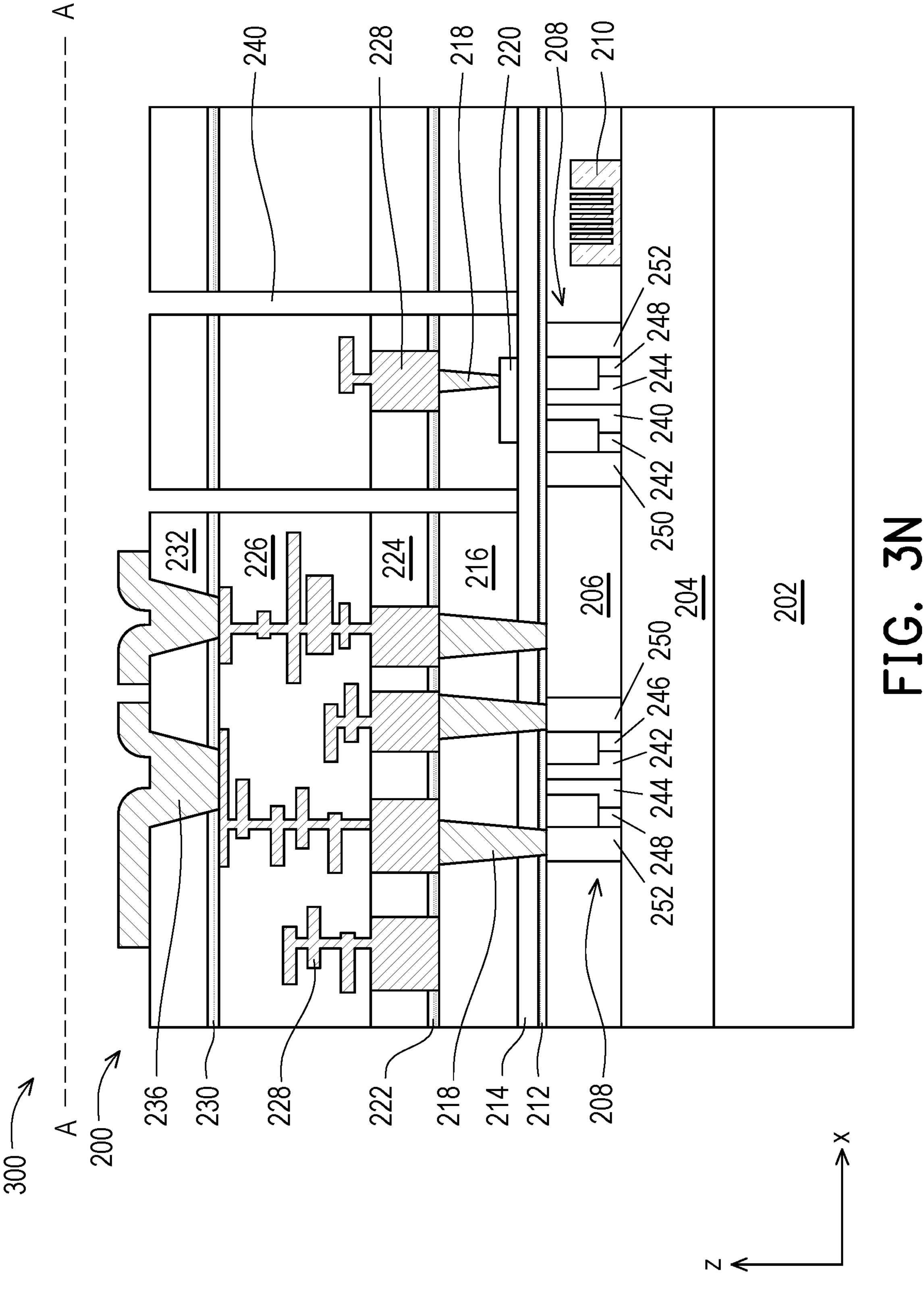
Figure 30:
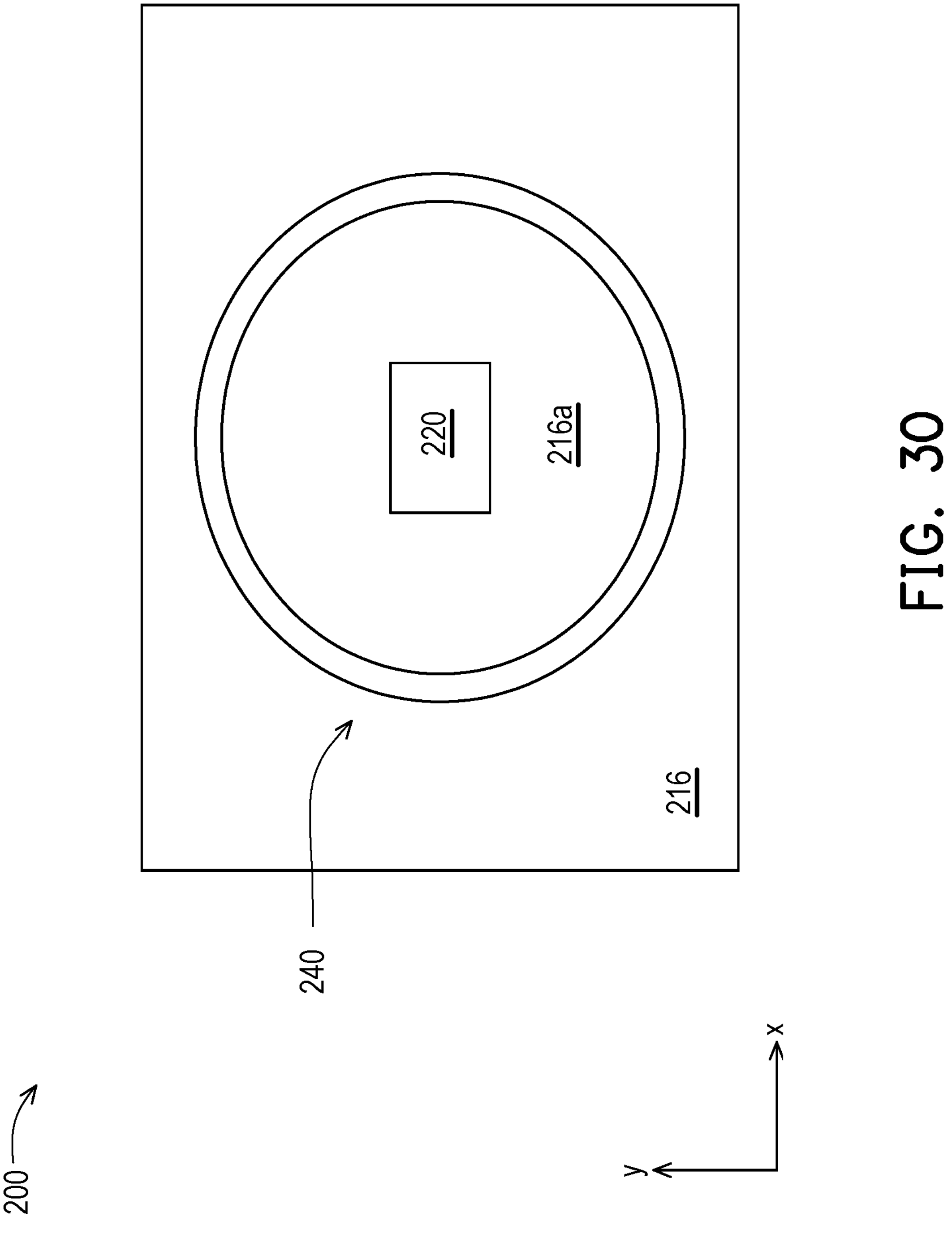
Figure 3P:
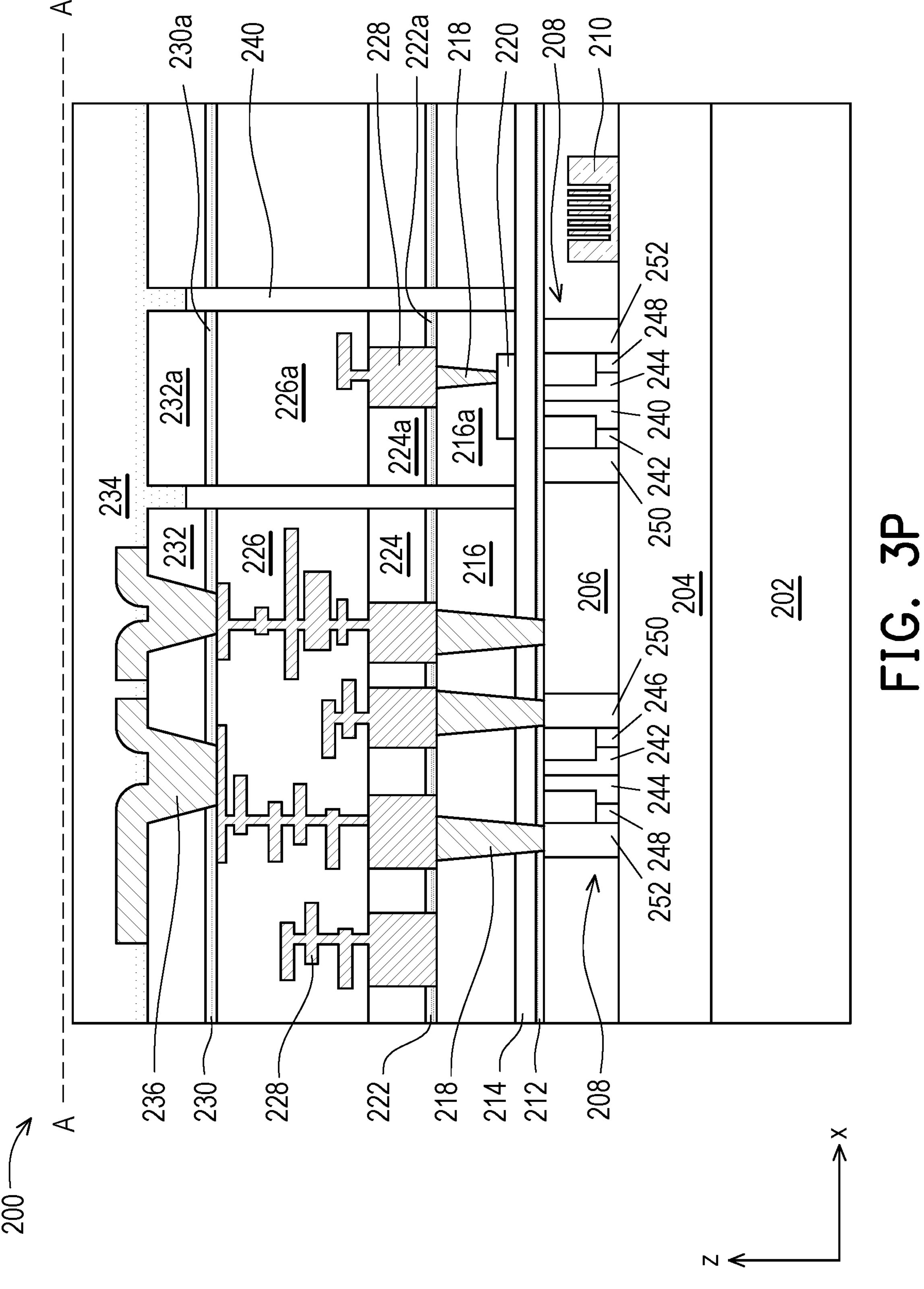
Figure 3Q:
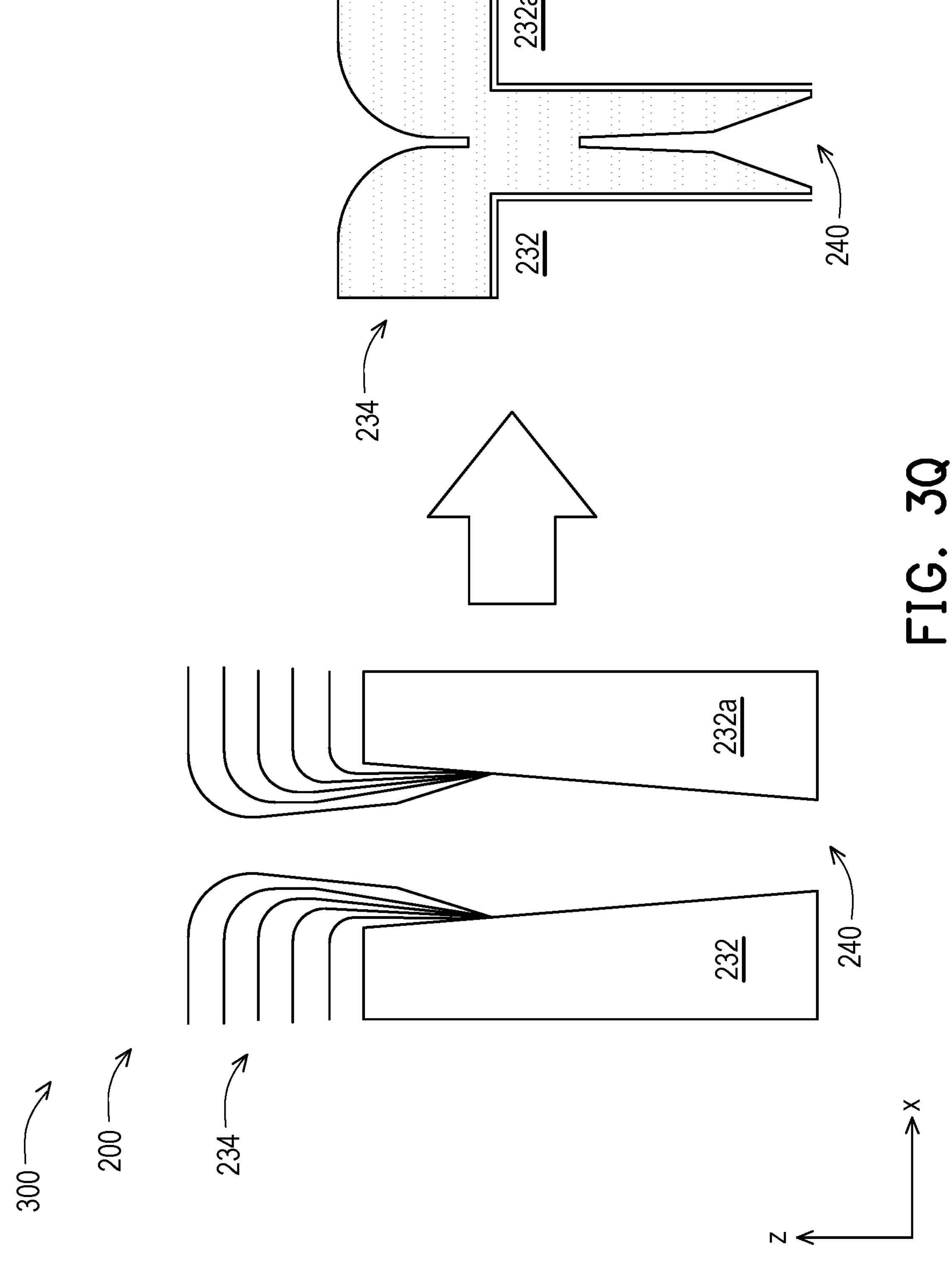
Figure 3R:
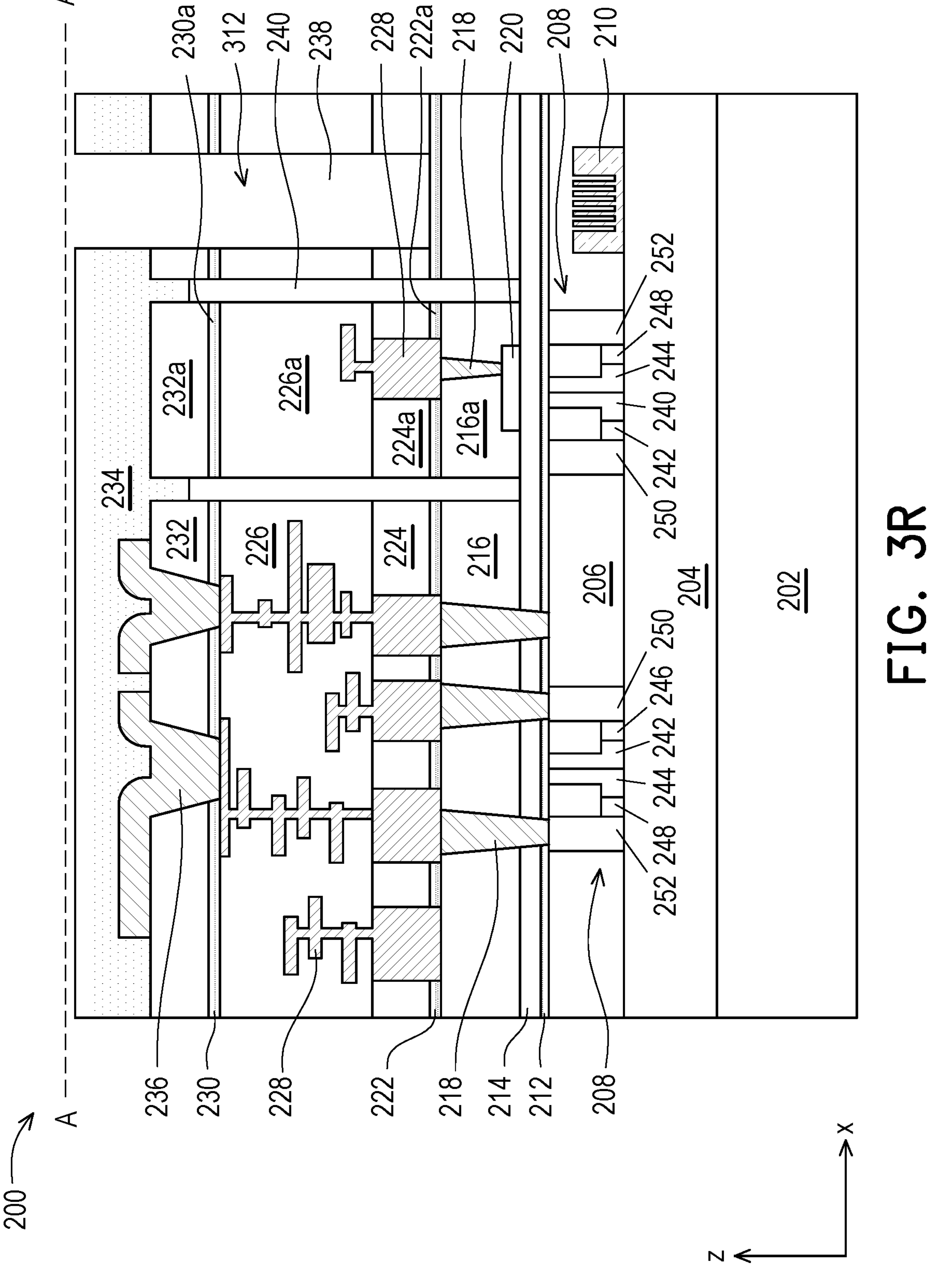
Figure 3S:
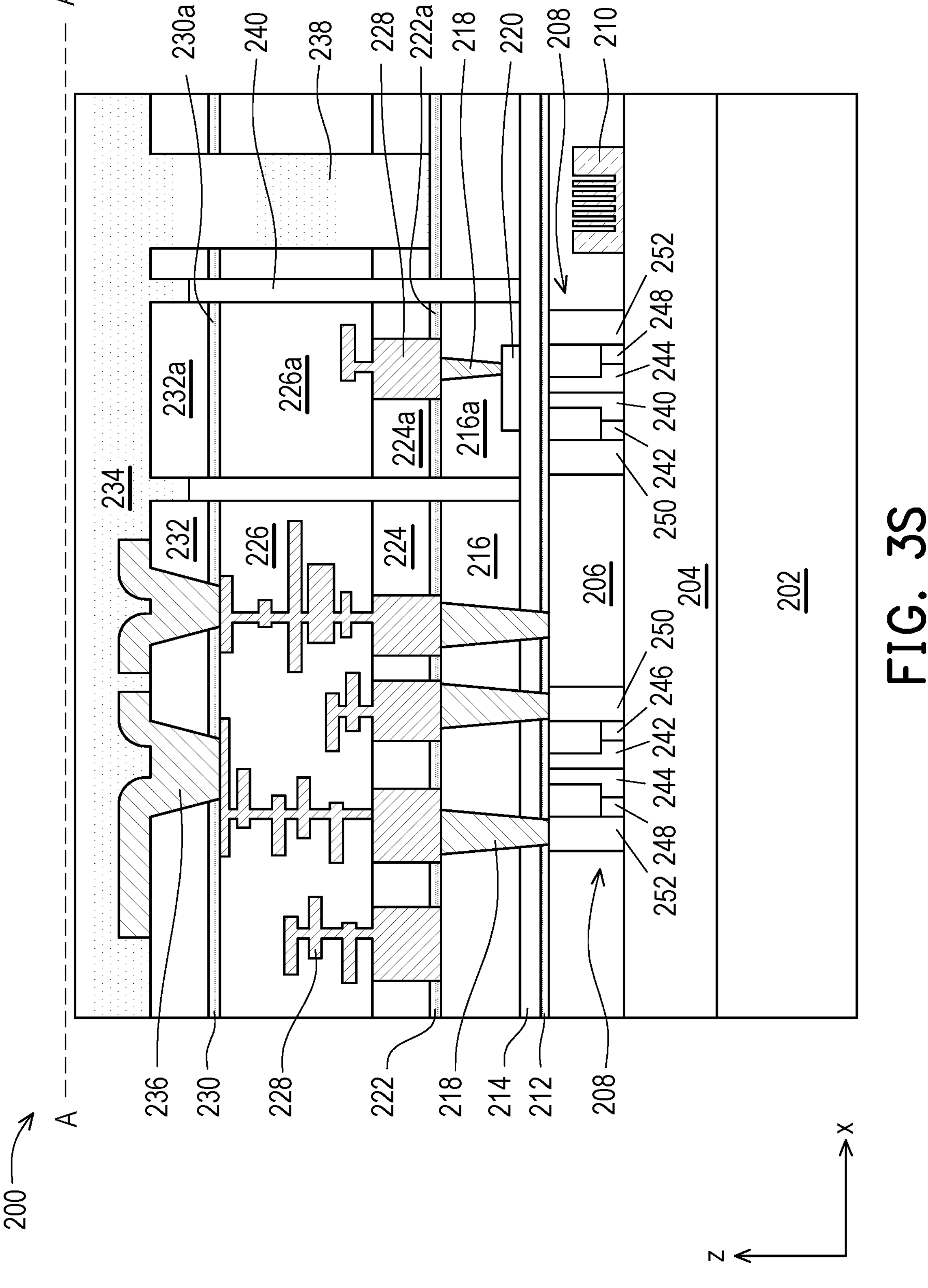

FIGS. 3A-3S are diagrams of an example implementation 300 of forming the semiconductor photonics device 200 (or a portion thereof) described herein. In some implementations, one or more of the semiconductor processing operations described in connection with the example implementation 300 may be performed by one or more of the semiconductor processing tools 102-114 and/or by the wafer/die transport tool 116. In some implementations, one or more of the semiconductor processing operations described in connection with the example implementation 300 may be performed by another semiconductor processing tool.

Turning to FIG. 3A, a substrate 302 may be provided. The substrate 302 may include a silicon on insulator (SOI) substrate that includes the substrate 202 (e.g., a silicon (Si) substrate and/or another type of semiconductor substrate), the dielectric layer 204 (e.g., a BOX layer and/or another type of insulator layer) over and/or on the substrate 202, and a semiconductor layer 304 (e.g., a silicon (Si) layer and/or another type of semiconductor layer) over and/or on the dielectric layer 204.

Alternatively, the substrate 202 may be provided as a semiconductor wafer, and the deposition tool 102 may form the dielectric layer 204 over and/or on the substrate 202, and may form the semiconductor layer 304 over and/or on the dielectric layer 204. The deposition tool 102 may be used to deposit the dielectric layer 204 using a CVD technique, a PVD technique, an oxidation technique (e.g., a thermal oxidation technique), and/or another type of deposition technique. The deposition tool 102 may be used to deposit the semiconductor layer 304 using a CVD technique, a PVD technique, an epitaxy technique, and/or another type of deposition technique.

As shown in FIG. 3B, the optical modulator structure 208 and the grating coupler structure 210 are formed in the semiconductor layer 304. In some implementations, a pattern in a hard mask layer is used to etch the semiconductor layer 304 to form the optical modulator structure 208 and the grating coupler structure 210.

A deposition tool 102 may be used to deposit the hard mask layer on the semiconductor layer 304 (e.g., using a CVD technique, a PVD technique, and/or another type of deposition technique), and may form a photoresist layer on the hard mask layer (e.g., using a spin-coating technique and/or another type of deposition technique). An exposure tool 104 may be used to expose the photoresist layer to a radiation source to form a pattern the photoresist layer. A developer tool 106 may be used to develop and remove portions of the photoresist layer to expose the pattern. An etch tool 108 may be used to etch the hard mask layer to transfer the pattern from the photoresist layer to the hard mask layer. The etch tool 108 may be used to etch the semiconductor layer 304 based on the pattern in the hard mask layer to form the optical modulator structure 208 and the grating coupler structure 210 by removing portions of the semiconductor layer 304 based on the pattern. In some implementations, the etch operation includes a plasma etch operation, a wet chemical etch operation, and/or another type of etch operation. In some implementations, a photoresist removal tool removes the remaining portions of the photoresist layer (e.g., using a chemical stripper, plasma ashing, and/or another technique). In some implementations, a photoresist removal tool removes the remaining portions of the photoresist layer (e.g., using a chemical stripper, plasma ashing, and/or another technique). In some implementations, a planarization tool 110 is used to remove the remaining portions of the hard mask layer using a CMP technique and/or another type of planarization technique.

As shown in FIG. 3C, the dielectric layer 206 is deposited over and/or on the dielectric layer 204. Moreover, the dielectric layer 206 is deposited over and/or on the optical modulator structure 208 and the grating coupler structure 210. A deposition tool 102 may be used to deposit the dielectric layer 206 using a CVD technique, a PVD technique, an oxidation technique (e.g., a thermal oxidation technique), and/or another type of deposition technique. In some implementations, the dielectric layer 206 is deposited such that the dielectric layer 206 encapsulates the optical modulator structure 208 and/or the grating coupler structure 210. A planarization tool 110 may be used to perform a CMP operation and/or another type of planarization operation to planarize the dielectric layer 206 such that the top surface of the dielectric layer 206 is co-planar with the top surface of the optical modulator structure 208.

As shown in FIG. 3D, one or more portions of the optical modulator structure 208 may be doped with one or more types of dopants to form one or more doped regions in the optical modulator structure 208. For example, an ion implantation tool 114 may be used to implant a p-doped region 242 with p-ions using an ion implantation technique and/or another type of doping technique. As another example, the ion implantation tool 114 may be used to implant an n-doped region 244 with n-ions using an ion implantation technique and/or another type of doping technique. As another example, the ion implantation tool 114 may be used to implant a p doped region 246 with p-type ions using an ion implantation technique and/or another type of doping technique. As another example, the ion implantation tool 114 may be used to implant an n doped region 248 with n-type ions using an ion implantation technique and/or another type of doping technique. As another example, the ion implantation tool 114 may be used to implant a p+ doped region 250 with p+ ions using an ion implantation technique and/or another type of doping technique. As another example, the ion implantation tool 114 may be used to implant an n+ doped region 252 with n+ ions using an ion implantation technique and/or another type of doping technique.

As shown in FIG. 3E, one or more additional layers may be formed over and/or on the dielectric layer 206 after formation of the optical modulator structure 208 and/or after formation of the grating coupler structure 210. For example, the ESL 212 and/or 214 may be formed over and/or on the dielectric layer 206. As another example, a first portion of the dielectric layer 216 may be formed over and/or on the ESL 214. A deposition tool 102 may deposit the ESL 212, the ESL 214, and/or the first portion of the dielectric layer 216 using a PVD technique, an ALD technique, a CVD technique an oxidation technique, another type of deposition technique described in connection with FIG. 1, and/or another suitable deposition technique. In some implementations, a planarization tool 110 is used to planarize the ESL 212, the ESL 214, and/or the first portion of the dielectric layer 216 after the ESL 212, the ESL 214, and/or the first portion of the dielectric layer 216 are deposited.

As shown in FIG. 3F, a recess 306 is formed in the first portion of the dielectric layer 216. The recess 306 is formed above the optical modulator structure 208 in the z-direction in the semiconductor photonics device 200. The recess 306 may be formed in preparation for forming the modulator heater structure 220 in the dielectric layer 216.

In some implementations, a pattern in a photoresist layer is used to etch the first portion of the dielectric layer 216 to form the recess 306. In these implementations, a deposition tool 102 is used to form the photoresist layer on the first portion of the dielectric layer 216. An exposure tool 104 is used to expose the photoresist layer to a radiation source to pattern the photoresist layer. A developer tool 106 is used to develop and remove portions of the photoresist layer to expose the pattern. An etch tool 108 is used to etch the first portion of the dielectric layer 216 based on the pattern to form the recess 306 in the first portion of the dielectric layer 216. In some implementations, the etch operation includes a plasma etch operation, a wet chemical etch operation, and/or another type of etch operation. In some implementations, a photoresist removal tool removes the remaining portions of the photoresist layer (e.g., using a chemical stripper, plasma ashing, and/or another technique). In some implementations, a hard mask layer is used as an alternative technique for etching the first portion of the dielectric layer 216 based on a pattern.

As shown in FIG. 3G, the modulator heater structure 220 is formed in the recess 306. A deposition tool 102 and/or a plating tool 112 may be used to deposit the modulator heater structure 220 using a CVD technique, a PVD technique, an ALD technique, an electroplating technique, another deposition technique described above in connection with FIG. 1, and/or another suitable deposition technique. In some implementations, a seed layer is first deposited, and the modulator heater structure 220 is deposited on the seed layer. In some implementations, a planarization tool 110 is used to planarize the modulator heater structure 220 after the modulator heater structure 220 is deposited.

As shown in FIG. 3H, a second portion of the dielectric layer 216 is formed over and/or on the first portion of the dielectric layer 216. The second portion of the dielectric layer 216 is also formed over and/or on the modulator heater structure 220. A deposition tool 102 may be used to deposit the second portion of the dielectric layer 216 using a CVD technique, a PVD technique, an oxidation technique (e.g., a thermal oxidation technique), and/or another type of deposition technique. In some implementations, a planarization tool 110 is used to planarize the dielectric layer 216 after the second portion of the dielectric layer 216 is deposited.

As further shown in FIG. 3H, recesses 308 are formed through the dielectric layer 216, through the ESL 214, and/or through the ESL 212. For example, a recess 308 may be formed through the dielectric layer 216, through the ESL 214, and through the ESL 212 to the p+ doped region 250 of the optical modulator structure 208 such that the p+ doped region 250 is exposed through the recess 308. As another example, a recess 308 may be formed through the dielectric layer 216, through the ESL 214, and through the ESL 212 to the n+ doped region 252 of the optical modulator structure 208 such that the n+ doped region 252 is exposed through the recess 308. As another example, a recess 308 may be formed in the dielectric layer 216 to the modulator heater structure 220 such that the modulator heater structure 220 is exposed through the recess 308.

In some implementations, a pattern in a photoresist layer is used to etch the dielectric layer 216, the ESL 214, and/or the ESL 212 to form the recesses 308. In these implementations, a deposition tool 102 is used to form the photoresist layer on the dielectric layer 216. An exposure tool 104 is used to expose the photoresist layer to a radiation source to pattern the photoresist layer. A developer tool 106 is used to develop and remove portions of the photoresist layer to expose the pattern. An etch tool 108 is used to etch through the dielectric layer 216, through the ESL 214, and/or through the ESL 212 to form the recesses 308. In some implementations, the etch operation includes a plasma etch operation, a wet chemical etch operation, and/or another type of etch operation. In some implementations, a photoresist removal tool removes the remaining portions of the photoresist layer (e.g., using a chemical stripper, plasma ashing, and/or another technique). In some implementations, a hard mask layer is used as an alternative technique for forming the recesses 308 based on a pattern.

As shown in FIG. 3I, a contact structure 218 is formed in the recess 308 over the p+ region 250 of the optical modulator structure 208 such that the contact structure 218 lands on the p+ region 250. A contact structure 218 is formed in the recess 308 over the n+ region 252 of the optical modulator structure 208 such that the contact structure 218 lands on n+ region 252. A contact structure 218 is formed in the recess 308 over the modulator heater structure 220 such that the contact structure 218 lands on the modulator heater structure 220.

A deposition tool 102 and/or a plating tool 112 may be used to deposit the contact structures 218 using in a CVD technique, a PVD technique, an ALD technique, an electroplating technique, another deposition technique described above in connection with FIG. 1, and/or another suitable deposition technique. In some implementations, a seed layer is first deposited, and one or more of the contact structures 218 are deposited on the seed layer. In some implementations, a planarization tool 110 is used to planarize one or more of the contact structures 218.

As shown in FIG. 3J, the ESL 222 is formed over and/or on the dielectric layer 216 and over and/or on the contact structures 218. The dielectric layer 224 is formed over and/or on the ESL 222. The dielectric layer 226 is formed over and/or on the dielectric layer 224. A deposition tool 102 may deposit the ESL 222, the dielectric layer 224, and/or the dielectric layer 226 using a PVD technique, an ALD technique, a CVD technique, an oxidation technique, another type of deposition technique described in connection with FIG. 1, and/or another suitable deposition technique. In some implementations, a planarization tool 110 is used to planarize the ESL 222, the dielectric layer 224, and/or the dielectric layer 226 after the deposition tool 102 deposits the ESL 222, the dielectric layer 224, and/or the dielectric layer 226.

As further shown in FIG. 3J, the metallization layers 228 are formed in and/or through the ESL 222, in and/or through the dielectric layer 224, and/or in and/or through the dielectric layer 226.

A deposition tool 102 and/or a plating tool 112 may deposit the metallization layers 228 using a CVD technique, a PVD technique, an ALD technique, an electroplating technique, another deposition technique described above in connection with FIG. 1, and/or another suitable deposition technique. In some implementations, a seed layer is first deposited, and the one or more metallization layers 228 are deposited on the seed layer. In some implementations, a planarization tool 110 is used to planarize one or more of the metallization layers 228 after one or more of the metallization layers 228 are deposited.

In some implementations, the metallization layers 228 are formed in a plurality of deposition operations. For example, the ESL 222 and the dielectric layer 224 may be formed, and a first set of one or more metallization layers 228 is formed in and/or through the ESL 222 and the dielectric layer 224 such that the first set of one or more metallization layers 228 lands on the contact structures 218. A first portion of the dielectric layer 226 may then be formed, and a second set of one or more metallization layers 228 is formed in the first portion of the dielectric layer 226. A second portion of the dielectric layer 226 may then be formed, and a third set of one or more metallization layers 228 is formed in the first portion of the dielectric layer 226. These operations may continue until a particular quantity of metallization layers 228 is formed.

As shown in FIG. 3K, the ESL 230 is formed over and/or on the dielectric layer 226. The passivation layer 232 is formed over and/or on the ESL 230. A deposition tool 102 may be used to deposit the ESL 230 and/or the passivation layer 232 using a PVD technique, an ALD technique, a CVD technique, an oxidation technique, another type of deposition technique described in connection with FIG. 1, and/or another suitable deposition technique. In some implementations, a planarization tool 110 is used to planarize the ESL 230 and/or the passivation layer 232 after the ESL 230 and/or the passivation layer 232 are deposited.

As further shown in FIG. 3L, recesses 310 are formed through the passivation layer 232 and/or through the ESL 230. One or more metallization layers 228 are exposed through the recesses 310.

In some implementations, a pattern in a photoresist layer is used to etch the passivation layer 232 and/or the ESL 230 to form the recesses 310. In these implementations, a deposition tool 102 is used to form the photoresist layer on the passivation layer 232. An exposure tool 104 is used to expose the photoresist layer to a radiation source to pattern the photoresist layer. A developer tool 106 is used to develop and remove portions of the photoresist layer to expose the pattern. An etch tool 108 is used to etch through the passivation layer 232 and/or through the ESL 230 to form the recesses 310. In some implementations, the etch operation includes a plasma etch operation, a wet chemical etch operation, and/or another type of etch operation. In some implementations, a photoresist removal tool removes the remaining portions of the photoresist layer (e.g., using a chemical stripper, plasma ashing, and/or another technique). In some implementations, a hard mask layer is used as an alternative technique for forming the recesses 310 based on a pattern.

As shown in FIG. 3M, the metal pads 236 are formed in the recesses 310 such that the metal pads 236 land on the metallization layers 228. A deposition tool 102 and/or a plating tool 112 may be used to deposit the metal pads 236 using in a CVD technique, a PVD technique, an ALD technique, an electroplating technique, another deposition technique described above in connection with FIG. 1, and/or another suitable deposition technique. In some implementations, a seed layer is first deposited, and one or more of the metal pads 236 are deposited on the seed layer.

As shown in FIG. 3N, the isolation trench 240 is formed in and/or through the passivation layer 232, the ESL 230, the dielectric layer 226, the dielectric layer 224, the ESL 222, and the dielectric layer 226. As shown in FIG. 3O, the isolation trench 240 is formed around the modulator heater structure 220 such that the isolation trench 240 surrounds the modulator heater structure 220 and has a rounded (e.g., ring-shaped) top view shape in a top-down view of the semiconductor photonics device 200.

In some implementations, a pattern in a photoresist layer is used to etch the passivation layer 232, the ESL 230, the dielectric layer 226, the dielectric layer 224, the ESL 222, and the dielectric layer 216 to form the isolation trench 240. In these implementations, a deposition tool 102 is used to form the photoresist layer on the passivation layer 232. An exposure tool 104 is used to expose the photoresist layer to a radiation source to pattern the photoresist layer. A developer tool 106 is used to develop and remove portions of the photoresist layer to expose the pattern. An etch tool 108 is used to etch through the passivation layer 232, the ESL 230, the dielectric layer 226, the dielectric layer 224, the ESL 222, and the dielectric layer 216 to form the isolation trench 240. The etching of the isolation trench 240 stops on the ESL 214 such that the isolation trench 240 does not extend around the optical modulator structure 208 in the dielectric layer 206. In some implementations, the etch operation includes a plasma etch operation, a wet chemical etch operation, and/or another type of etch operation. In some implementations, a photoresist removal tool removes the remaining portions of the photoresist layer (e.g., using a chemical stripper, plasma ashing, and/or another technique). In some implementations, a hard mask layer is used as an alternative technique for forming the isolation trench 240 based on a pattern.

As shown in FIG. 3P, the dielectric layer 234 is formed over and/or on the passivation layer 232. The dielectric layer 234 is also formed over and/or on the metal pads 236. A deposition tool 102 may be used to deposit the dielectric layer 234 using a PVD technique, an ALD technique, a CVD technique, an oxidation technique, another type of deposition technique described in connection with FIG. 1, and/or another suitable deposition technique. In some implementations, a planarization tool 110 is used to planarize the dielectric layer 234 after the dielectric layer 234 is deposited.

As further shown in FIG. 3P, the dielectric layer 234 seals the top opening of the isolation trench 240. As shown in FIG. 3Q, the dielectric layer 234 may be deposited such that the material of the dielectric layer 234 closes the gap between the isolated portion 232*a* of the passivation layer 232 and the other portions of the passivation layer 232 before the isolation trench 240 is fully filled with the material of the dielectric layer 234. This ensures that the dielectric layer 234 is primarily filled with a gas, which enables the isolation trench 240 to provide the thermal and/or structural isolation.

As shown in FIG. 3R, a recess 312 is formed along a side of the isolation trench 240. The recess 312 may be formed above the grating coupler structure 210 in the z-direction in the semiconductor photonics device 200. The recess 312 may be formed through the dielectric layer 234, the passivation layer 232, the ESL 230, the dielectric layer 226, and the dielectric layer 224.

In some implementations, a pattern in a photoresist layer is used to etch the dielectric layer 234, the passivation layer 232, the ESL 230, the dielectric layer 226, and the dielectric layer 224 to form the recess 312. In these implementations, a deposition tool 102 is used to form the photoresist layer on the dielectric layer 234. An exposure tool 104 is used to expose the photoresist layer to a radiation source to pattern the photoresist layer. A developer tool 106 is used to develop and remove portions of the photoresist layer to expose the pattern. An etch tool 108 is used to etch through the dielectric layer 234, the passivation layer 232, the ESL 230, the dielectric layer 226, and the dielectric layer 224 to form the isolation trench 240. The etching of the recess 312 stops on the ESL 222. In some implementations, the etch operation includes a plasma etch operation, a wet chemical etch operation, and/or another type of etch operation. In some implementations, a photoresist removal tool removes the remaining portions of the photoresist layer (e.g., using a chemical stripper, plasma ashing, and/or another technique). In some implementations, a hard mask layer is used as an alternative technique for forming the recess 312 based on a pattern.

As shown in FIG. 3S, the recess 312 may be filled with a dielectric material to form the grating coupler transmission region 238 along the side of the isolation trench 240. In some implementations, an optical fiber may first be inserted into the recess 312, and the recess 312 may then be filled with the dielectric material to encapsulate the optical fiber in the recess 312. The dielectric material of the grating coupler transmission region 238 may merge with the dielectric layer 234.

As indicated above, FIGS. 3A-3S are provided as an example. Other examples may differ from what is described with regard to FIGS. 3A-3S.

Figure 4:
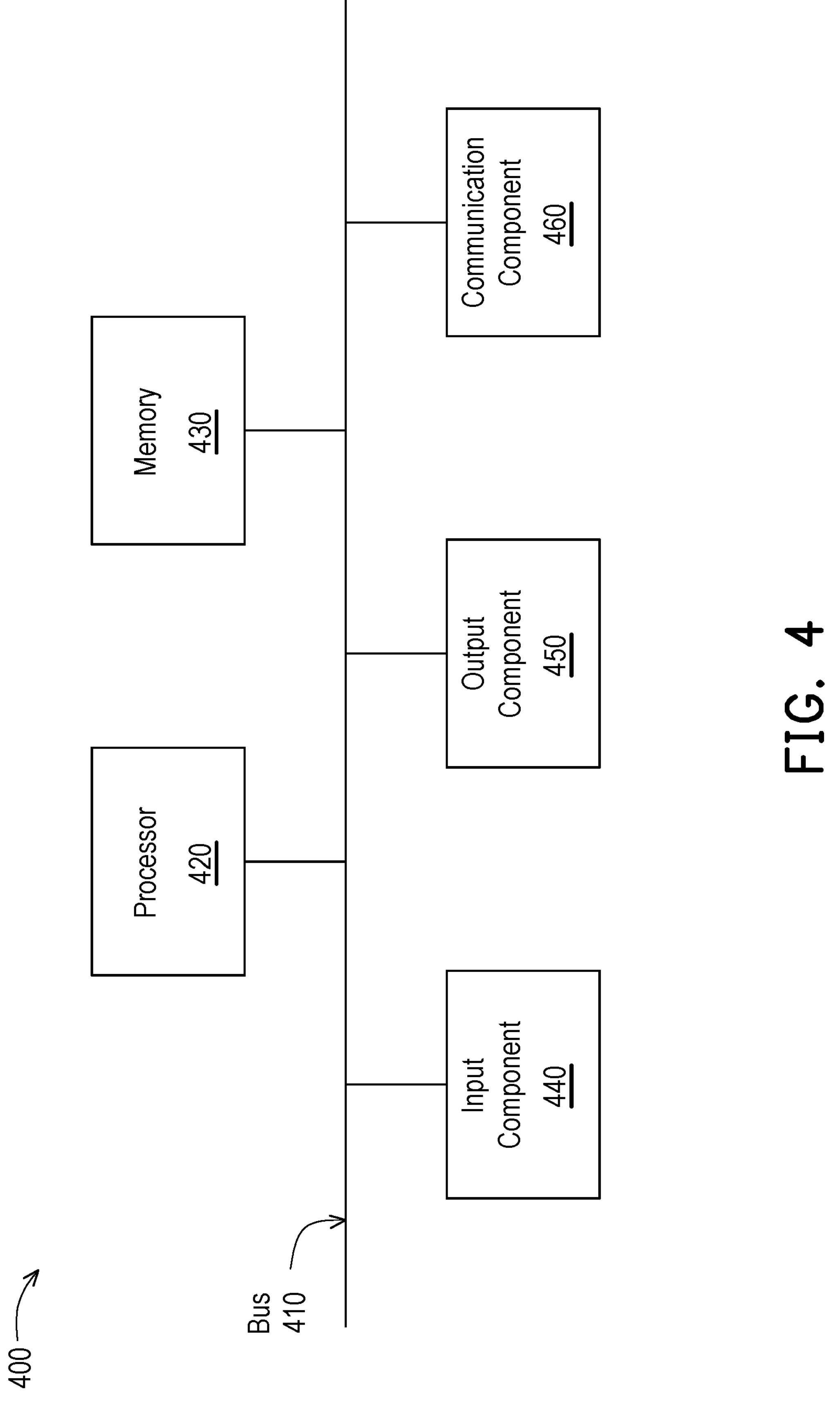
FIG. 4 is a diagram of example components of a device described herein.

FIG. 4 is a diagram of example components of a device 400 described herein. In some implementations, one or more of the semiconductor processing tools 102-114 and/or the wafer/die transport tool 116 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
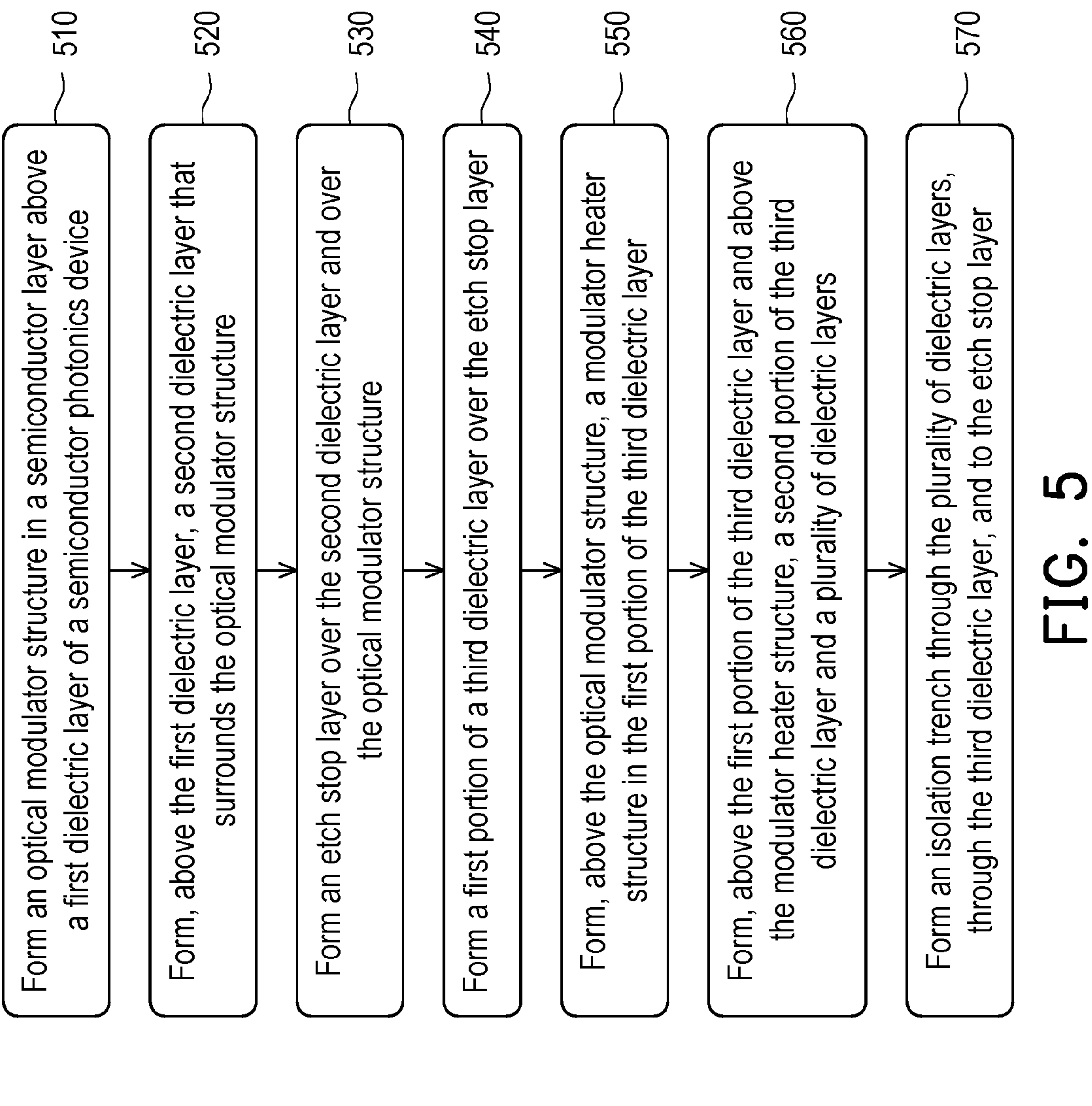
FIG. 5 is a flowchart of an example process associated with forming a semiconductor photonics device described herein.

FIG. 5 is a flowchart of an example process 500 associated with forming a semiconductor photonics device described herein. In some implementations, one or more process blocks of FIG. 5 are performed using one or more semiconductor processing tools (e.g., one or more of the semiconductor processing tools 102-114). Additionally, or alternatively, one or more process blocks of FIG. 5 may be performed using one or more components of device 400, such as processor 420, memory 430, input component 440, output component 450, and/or communication component 460.

As shown in FIG. 5, process 500 may include forming an optical modulator structure in a semiconductor layer above a first dielectric layer of a semiconductor photonics device (block 510). For example, one or more of the semiconductor processing tools 102-114 may be used to form an optical modulator structure (e.g., an optical modulator structure 208) in a semiconductor layer (e.g., a semiconductor layer 304) above a first dielectric layer (e.g., a dielectric layer 204 of a semiconductor photonics device (e.g., a semiconductor photonics device 200), as described herein.

As further shown in FIG. 5, process 500 may include forming, above the first dielectric layer, a second dielectric layer that surrounds the optical modulator structure (block 520). For example, one or more of the semiconductor processing tools 102-114 may be used to form, above the first dielectric layer, a second dielectric layer (e.g., a dielectric layer 206) that surrounds the optical modulator structure, as described herein.

As further shown in FIG. 5, process 500 may include forming an etch stop layer over the second dielectric layer and over the optical modulator structure (block 530). For example, one or more of the semiconductor processing tools 102-114 may be used to form an etch stop layer (e.g., an ESL 214) over the second dielectric layer and over the optical modulator structure, as described herein.

As further shown in FIG. 5, process 500 may include forming a first portion of a third dielectric layer over the etch stop layer (block 540). For example, one or more of the semiconductor processing tools 102-114 may be used to form a first portion of a third dielectric layer (e.g., a dielectric layer 216) over the etch stop layer, as described herein.

As further shown in FIG. 5, process 500 may include forming, above the optical modulator structure, a modulator heater structure in the first portion of the third dielectric layer (block 550). For example, one or more of the semiconductor processing tools 102-114 may be used to form, above the optical modulator structure, a modulator heater structure (e.g., a modulator heater structure 220) in the first portion of the third dielectric layer, as described herein.

As further shown in FIG. 5, process 500 may include forming, above the first portion of the third dielectric layer and above the modulator heater structure, a second portion of the third dielectric layer and a plurality of dielectric layers (block 560). For example, one or more of the semiconductor processing tools 102-114 may be used to form, above the first portion of the third dielectric layer and above the modulator heater structure, a second portion of the third dielectric layer and a plurality of dielectric layers (e.g., an ESL 222, a dielectric layer 224, a dielectric layer 226), as described herein.

As further shown in FIG. 5, process 500 may include forming an isolation trench through the plurality of dielectric layers, through the third dielectric layer, and to the etch stop layer (block 570). For example, one or more of the semiconductor processing tools 102-114 may be used to form an isolation trench (e.g., an isolation trench 240) through the plurality of dielectric layers, through the third dielectric layer, and to the etch stop layer, as described herein. In some implementations, the isolation trench surrounds the modulator heater structure in a top view of the semiconductor photonics device. In some implementations, the isolation trench has a rounded top view shape in the top view of the semiconductor photonics device.

Process 500 may include additional implementations, such as any single implementation or any combination of implementations described below and/or in connection with one or more other processes described elsewhere herein.

In a first implementation, process 500 includes forming an oxide layer (e.g., a dielectric layer 234) above the plurality of dielectric layers, where the oxide layer seals a top opening of the isolation trench.

In a second implementation, alone or in combination with the first implementation, process 500 includes forming, adjacent to the optical modulator structure, a grating coupler structure (e.g., a grating coupler structure 210) in the semiconductor layer, and forming, through the plurality of dielectric layers, a grating coupler transmission region (e.g., a grating coupler transmission region 238), where forming the isolation trench includes forming the isolation trench adjacent to the grating coupler transmission region.

In a third implementation, alone or in combination with one or more of the first and second implementations, forming the isolation trench includes forming the isolation trench such that a distance (e.g., a dimension D1) between the modulator heater structure and the isolation trench is included in a range of approximately 10 microns to approximately 20 microns.

In a fourth implementation, alone or in combination with one or more of the first through third implementations, forming the isolation trench includes performing an acid-based wet etch operation to form the isolation trench.

In a fifth implementation, alone or in combination with one or more of the first through fourth implementations, forming the isolation trench includes forming the isolation trench such that a width (e.g., a dimension D2) of the isolation trench is included in a range of approximately 5 microns to approximately 15 microns.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

In this way, a semiconductor photonics device includes an optical modulator structure and a modulator heater structure in one or more dielectric layers of the semiconductor photonics device. An isolation trench is included around the modulator heater structure to reduce the likelihood of damage to the dielectric layer(s) that might otherwise be caused by thermal stress. The isolation trench may include an air gap through the dielectric layer(s), and the air gap surrounds the modulator heater structure in a top-down view of the semiconductor photonics device. The isolation trench reduces the amount of heat absorbed in the dielectric layer(s) in that the isolation trench thermally isolates the modulator heater structure from the dielectric layer(s). In particular, the isolation trench resists the transfer of heat from the modulator heater structure into the surrounding dielectric layer(s). This reduces the likelihood of cracking, delamination, and/or another type of damage to the dielectric layer(s) that might otherwise be caused by thermal stress to the dielectric layer(s).

As described in greater detail above, some implementations described herein provide a semiconductor photonics device. The semiconductor photonics device includes a substrate. The semiconductor photonics device includes one or more first dielectric layers over the substrate. The semiconductor photonics device includes an etch stop layer over the one or more first dielectric layers. The semiconductor photonics device includes a plurality of second dielectric layers over the etch stop layer. The semiconductor photonics device includes an optical modulator structure in the one or more first dielectric layers. The semiconductor photonics device includes a modulator heater structure in one or more of the plurality of second dielectric layers, where the modulator heater structure is located above the optical modulator structure. The semiconductor photonics device includes an isolation trench through the plurality of second dielectric layers, where the isolation trench is terminated on the etch stop layer, and where the isolation trench surrounds the modulator heater structure in a top view of the semiconductor photonics device.

As described in greater detail above, some implementations described herein provide a method. The method includes forming an optical modulator structure in a semiconductor layer above a first dielectric layer of a semiconductor photonics device. The method includes forming, above the first dielectric layer, a second dielectric layer that surrounds the optical modulator structure. The method includes forming an etch stop layer over the second dielectric layer and over the optical modulator structure. The method includes forming a first portion of a third dielectric layer over the etch stop layer. The method includes forming, above the optical modulator structure, a modulator heater structure in the first portion of the third dielectric layer. The method includes forming, above the first portion of the third dielectric layer and above the modulator heater structure, a second portion of the third dielectric layer and a plurality of dielectric layers. The method includes forming an isolation trench through the plurality of dielectric layers, through the third dielectric layer, and to the etch stop layer, where the isolation trench surrounds the modulator heater structure in a top view of the semiconductor photonics device, and where the isolation trench has a rounded top view shape in the top view of the semiconductor photonics device.

As described in greater detail above, some implementations described herein provide a semiconductor photonics device. The semiconductor photonics device includes a substrate. The semiconductor photonics device includes one or more first dielectric layers over the substrate. The semiconductor photonics device includes an etch stop layer over the one or more first dielectric layers. The semiconductor photonics device includes a plurality of second dielectric layers over the etch stop layer. The semiconductor photonics device includes an optical modulator structure in the one or more first dielectric layers. The semiconductor photonics device includes a modulator heater structure in one or more of the plurality of second dielectric layers, where the modulator heater structure is located above the optical modulator structure. The semiconductor photonics device includes an isolated region of the plurality of second dielectric layers, where the isolated region of the plurality of second dielectric layers is located above the optical modulator structure, where the modulator heater structure is included in the isolated region of the plurality of second dielectric layers, where the isolated region of the plurality of second dielectric layers is isolated from other regions of the plurality of second dielectric layers by an isolation trench, and where the isolated region of the plurality of second dielectric layers has a ring top view shape in a top view of the semiconductor photonics device.

The terms “approximately” and “substantially” can indicate a value of a given quantity or magnitude that varies within 5% of the value (e.g., ±1%, ±2%, ±3%, ±4%, ±5% of the value). These values are merely examples and are not intended to be limiting. It is to be understood that the terms “approximately” and “substantially” can refer to a percentage of the values of a given quantity in light of this disclosure.

As used herein, “satisfying a threshold” may, depending on the context, refer to a value being greater than the threshold, greater than or equal to the threshold, less than the threshold, less than or equal to the threshold, equal to the threshold, not equal to the threshold, or the like.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor photonics device, comprising:
- a substrate;
- one or more first dielectric layers over the substrate;
- an etch stop layer that is continuous and uninterrupted over the one or more first dielectric layers;
- a plurality of second dielectric layers over the etch stop layer;
- an optical modulator structure in the one or more first dielectric layers;
- a modulator heater structure in one or more of the plurality of second dielectric layers,
  - wherein the modulator heater structure is located above the optical modulator structure; and
- an isolation trench through the plurality of second dielectric layers,
  - wherein the isolation trench is terminated on the etch stop layer, and
  - wherein the isolation trench surrounds the modulator heater structure in a top view of the semiconductor photonics device.

2. The semiconductor photonics device of claim 1, wherein the modulator heater structure is located on a top surface of the etch stop layer.

3. The semiconductor photonics device of claim 1, wherein the isolation trench has a ring shape in the top view of the semiconductor photonics device.

4. The semiconductor photonics device of claim 1, wherein the isolation trench is filled with a gas.

5. The semiconductor photonics device of claim 1, wherein a distance between the modulator heater structure and the isolation trench is included in a range of approximately 10 microns to approximately 20 microns.

6. The semiconductor photonics device of claim 1, wherein a width of the isolation trench is included in a range of approximately 5 microns to approximately 15 microns.

7. The semiconductor photonics device of claim 1, further comprising:

an oxide layer above the plurality of second dielectric layers, wherein the isolation trench is sealed at a top of the isolation trench by the oxide layer.

8. The semiconductor photonics device of claim 7, wherein the oxide layer comprises a portion that is located along a side of the isolation trench.

9. A method, comprising:

forming an optical modulator structure in a semiconductor layer above a first dielectric layer of a semiconductor photonics device;

forming, above the first dielectric layer, a second dielectric layer that surrounds the optical modulator structure;

forming an etch stop layer over the second dielectric layer and over the optical modulator structure, wherein the second dielectric layer resides directly on the etch stop layer;

forming a first portion of a third dielectric layer over the etch stop layer;

forming, above the optical modulator structure, a modulator heater structure in the first portion of the third dielectric layer;

forming, above the first portion of the third dielectric layer and above the modulator heater structure, a second portion of the third dielectric layer and a plurality of dielectric layers; and forming an isolation trench through the plurality of dielectric layers, through the third dielectric layer, and to the etch stop layer, wherein the isolation trench surrounds the modulator heater structure in a top view of the semiconductor photonics device, and wherein the isolation trench has a rounded top view shape in the top view of the semiconductor photonics device.

10. The method of claim 9, further comprising:

forming an oxide layer above the plurality of dielectric layers, wherein the oxide layer seals a top opening of the isolation trench.

11. The method of claim 9, further comprising:

forming, adjacent to the optical modulator structure, a grating coupler structure in the semiconductor layer; and forming, through the plurality of dielectric layers, a grating coupler transmission region, wherein forming the isolation trench comprises:

forming the isolation trench adjacent to the grating coupler transmission region.

12. The method of claim 9, wherein forming the isolation trench comprises:

forming the isolation trench such that a distance between the modulator heater structure and the isolation trench is included in a range of approximately 10 microns to approximately 20 microns.

13. The method of claim 9, wherein forming the isolation trench comprises:

performing an acid-based wet etch operation to form the isolation trench.

14. The method of claim 9, wherein forming the isolation trench comprises:

forming the isolation trench such that a width of the isolation trench is included in a range of approximately 5 microns to approximately 15 microns.

15. A semiconductor photonics device, comprising:

a substrate;

one or more first dielectric layers over the substrate;

an etch stop layer over the one or more first dielectric layers;

a plurality of second dielectric layers over the etch stop layer, wherein a second dielectric layer, of the plurality of second dielectric layers, resides directly on the etch stop layer;

an optical modulator structure in the one or more first dielectric layers;

a modulator heater structure in one or more of the plurality of second dielectric layers, wherein the modulator heater structure is located above the optical modulator structure; and an isolated region of the plurality of second dielectric layers, wherein the isolated region of the plurality of second dielectric layers is located above the optical modulator structure, wherein the modulator heater structure is included in the isolated region of the plurality of second dielectric layers, wherein the isolated region of the plurality of second dielectric layers is isolated from other regions of the plurality of second dielectric layers by an isolation trench, and wherein the isolated region of the plurality of second dielectric layers has a ring top view shape in a top view of the semiconductor photonics device.

16. The semiconductor photonics device of claim 15, wherein the isolation trench comprises a ring-shaped air gap between the plurality of second dielectric layers and the isolated region of the plurality of second dielectric layers.

17. The semiconductor photonics device of claim 15, wherein a width of the isolated region of the plurality of second dielectric layers, between the modulator heater structure and the isolation trench, is included in a range of approximately 10 microns to approximately 20 microns.

18. The semiconductor photonics device of claim 15, further comprising:

an oxide layer above the plurality of second dielectric layers, wherein the isolation trench is sealed at a top of the isolation trench by the oxide layer.

19. The semiconductor photonics device of claim 15, wherein the modulator heater structure is located on the etch stop layer; and wherein the isolation trench is terminated on the etch stop layer.

20. The semiconductor photonics device of claim 15, wherein a distance between the isolated region of the plurality of second dielectric layers and the other regions of the plurality of second dielectric layers is included in a range of approximately 5 microns to approximately 15 microns.

* * * * *